United States Patent [19]

Kawaguchi et al.

[11] Patent Number: 5,023,308
[45] Date of Patent: Jun. 11, 1991

[54] AMINOTRIAZINE POLYMERS AND METHOD OF PREPARING SAME

[75] Inventors: Masayuki Kawaguchi; Yasushi Kita, both of Ube; Kayoko Yamamoto; Koji Nozaki, both of Yamguchi, all of Japan

[73] Assignee: Central Glass Company, Limited, Ube, Japan

[21] Appl. No.: 378,914

[22] Filed: Jul. 12, 1989

[30] Foreign Application Priority Data

Jul. 12, 1988 [JP] Japan .................................. 63-173186
Feb. 6, 1989 [JP] Japan ..................................... 1-27240

[51] Int. Cl.$^5$ ............................................. C08G 73/00
[52] U.S. Cl. ...................................... 528/423; 525/540; 528/422; 544/196
[58] Field of Search ............... 528/423, 422; 525/540; 544/196

[56] References Cited

FOREIGN PATENT DOCUMENTS 0068083A 1/1983 European Pat. Off. .
2097008A 10/1982 United Kingdom .

OTHER PUBLICATIONS

Y. Yuki, "Preparation and Polymerization of Vinyl Compounds Containing Trazine Rings", Kohbunshi, vol. 38, Mar. 1989, pp. 196–199 (Partial Translation).

Primary Examiner—Harold D. Anderson
Assistant Examiner—T. Mosley
Attorney, Agent, or Firm—Fleit, Jacobson, Cohn, Price, Holman & Stern

[57] ABSTRACT

A polymeric compound, named poly(amino-s-triazine), which has a layer structure with a structural unit represented by $(C_3N_3)_2N_xH_y$, where $2 \leq x \leq 4$ and $0 \leq y \leq 8$, is obtained by reaction of cyanuric trichloride with ammonia or melamine. This compound is stable in the air up to about 400° C. and exhibits fluorescence by excitation at wavelength of 365 nm. When the above reaction is carried out at a temperature ranging from room tempertaure to about 400° C. the product is an oligomeric compound $(C_3N_3)_a(NH)_b(NH_2)_cCl_d$, where $2 \leq a \leq 10$, $1 \leq b \leq 10$, $0 \leq c \leq 11$ and $1 \leq d \leq 12$, and poly(amino-s-triazine) is obtained by heating the oligomeric compound at 400°–600° C. in an inactive gas. The oligomeric compound too exhibits fluorescence and is higher in fluorescence intensity. An alkali metal ion can be introduced into poly(amino-s-triazine) by treatment with an alkali metal hydroxide solution, or hydroxyl group can be introduced by treatment with a mineral acid. In either case the modified polymer is very higher in fluorescence intensity and narrower in the width of flurorescence peak.

5 Claims, 16 Drawing Sheets

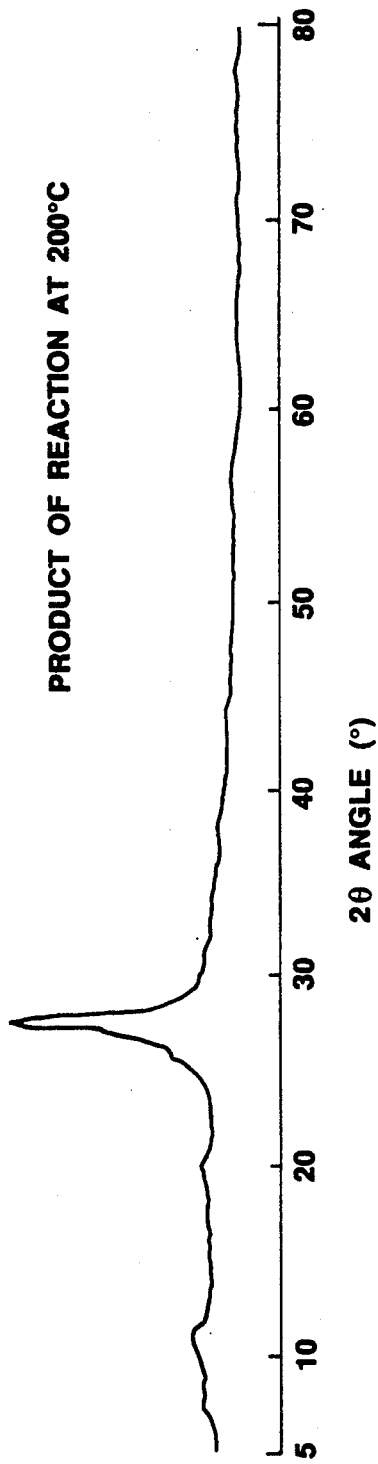
FIG.9(A) PRODUCT OF REACTION AT 200°C
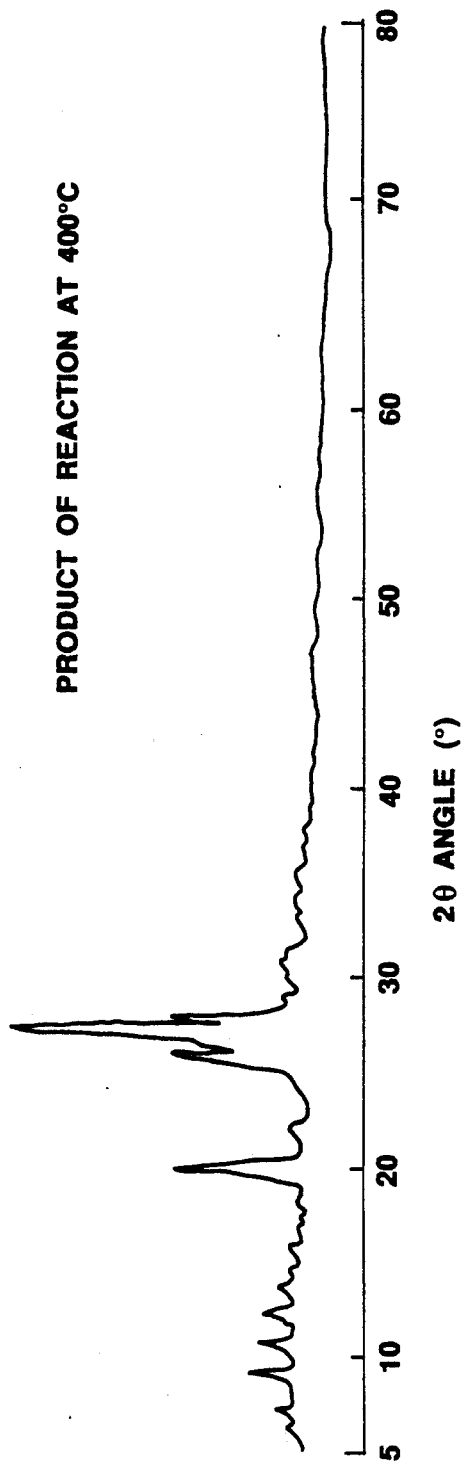
FIG.9(B) PRODUCT OF REACTION AT 400°C

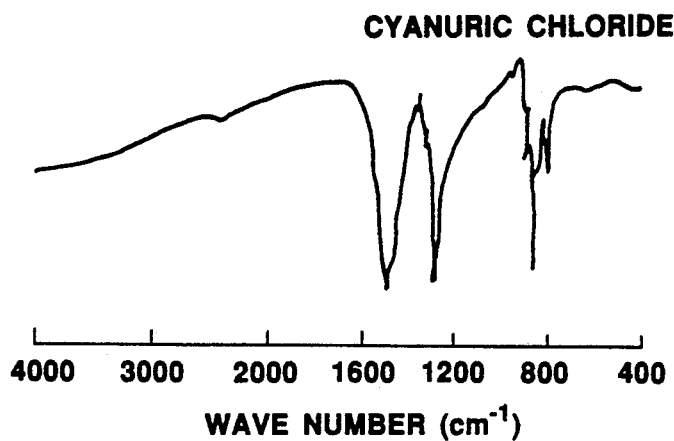
FIG.10(C) CYANURIC CHLORIDE
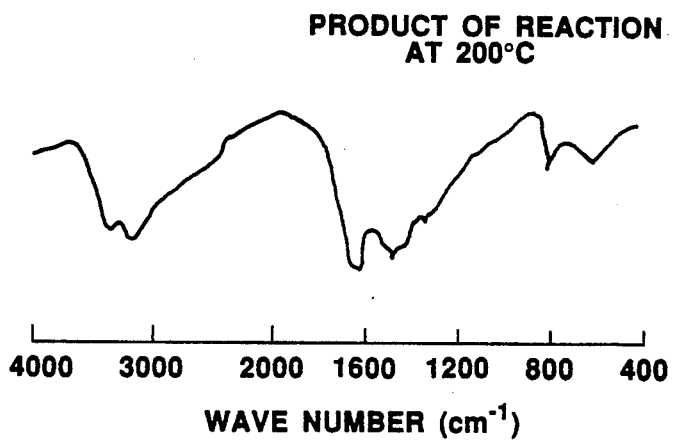
FIG.10(A) PRODUCT OF REACTION AT 200°C
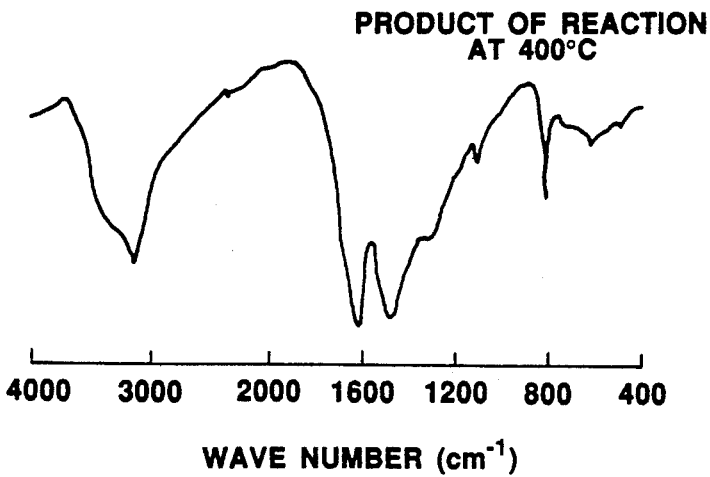
FIG.10(B) PRODUCT OF REACTION AT 400°C

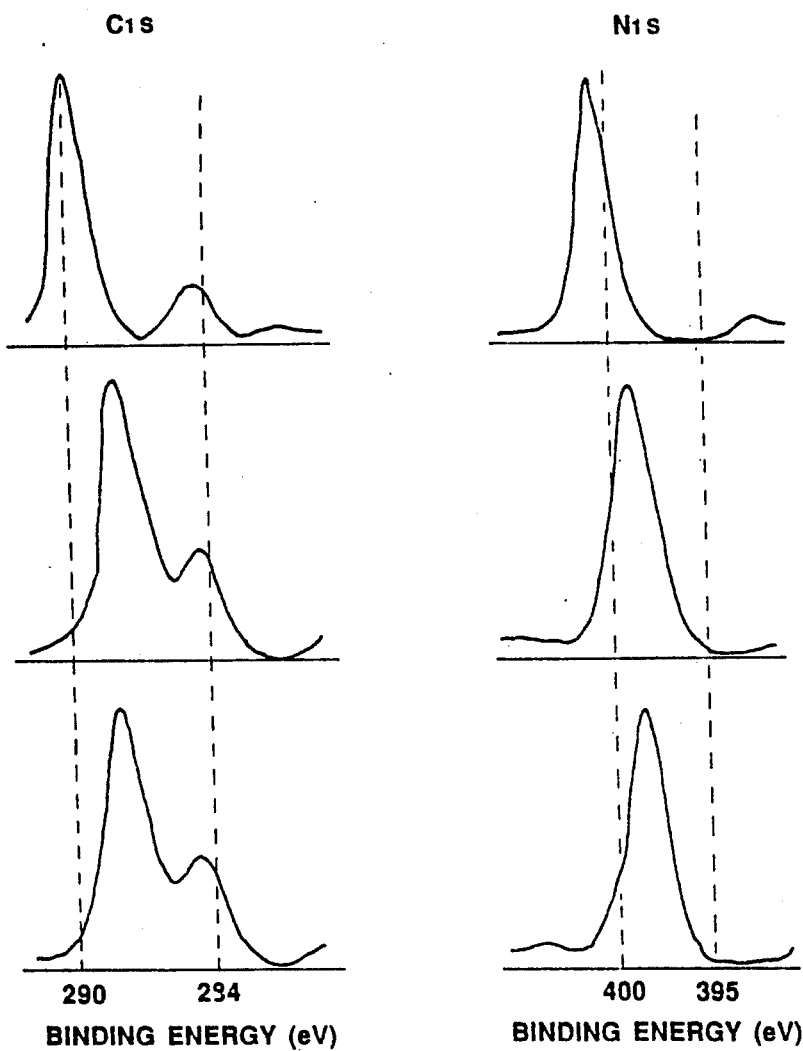

AMINOTRIAZINE POLYMERS AND METHOD OF PREPARING SAME

BACKGROUND OF THE INVENTION

This invention relates to novel polymeric compounds which are essentially composed of carbon, nitrogen and hydrogen and have s-triazine rings linked two-dimensionally and methods of preparing the novel compounds. The novel polymeric compounds are very interesting as fluorescent materials and, besides, will be useful as lubricating materials, semiconductive functional materials or heat resistant polymers.

Melamine resins have s-triazine rings in their molecules, but melamine resins are amorphous since the triazine rings are linked three-dimensionally disorderly. s-Triazine ring has six $\pi$-electrons, and the six atoms (three carbon atoms and three nitrogen atoms) that constitute the ring are in the same plane. Accordingly it is expectable that an optically and electrically important polymer will be obtained if s-triazine rings can be linked so as to extend two-dimensionally. However, until now no polymer of such a structure has been produced.

SUMMARY OF THE INVENTION

It is an object of the invention to provide a novel polymeric compound having a layer structure with s-triazine rings two-dimensionally linked in each layer.

It is another object of the invention to provide a method of preparing the novel polymeric compound.

Also it is an object of the invention to provide a novel oligomeric compound which has two-dimensionally linked s-triazine rings and can be converted into the aforementioned polymeric compound.

Further, it is an object of the invention to provide modifications of the aforementioned polymeric compound.

The present invention provides a polymeric compound, named poly(amino-s-triazine), which has a layer structure with a structural unit represented by the general formula (1):

$$(C_3N_3)_2N_xH_y \tag{1}$$

wherein $(C_3N_3)$ represents s-triazine ring, $2 \leq x \leq 4$, and $0 \leq y \leq 8$.

The two-dimensional structure of this polymeric compound is believed to be represented by the following structural formula (I). This structure is deduced from the results of elementary analysis, X-ray diffraction analysis, specific gravity measurement, infrared spectrum analysis, ESCA (electron spectroscopy for chemical analysis) and fluorescence spectrum analysis.

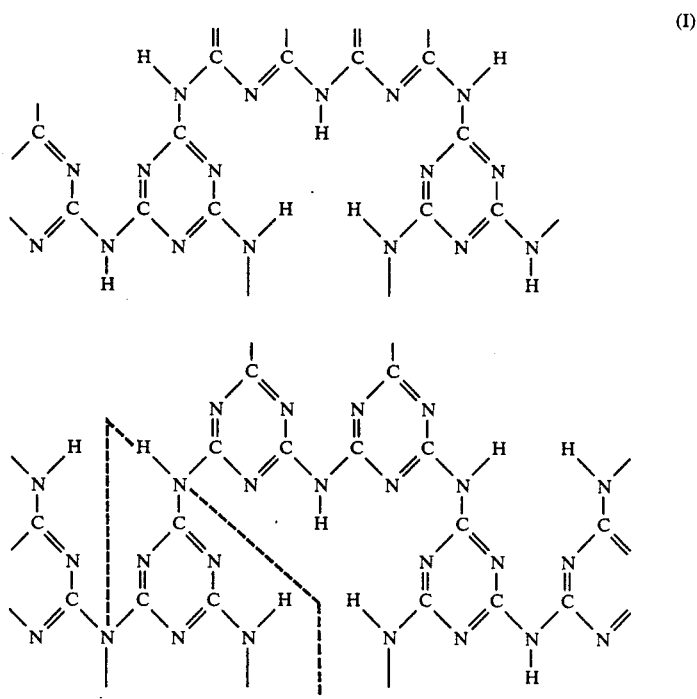

(I)

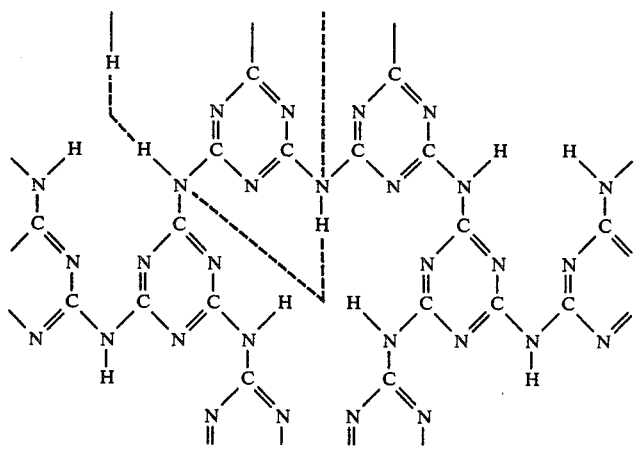

In the above formula the parallelogram in broken line indicates unit cell.

The fundamental step of the preparation of poly(amino-s-triazine) is reacting cyanuric trichloride with ammonia or melamine. When the reaction is carried out as a gas-gas reaction at a temperature above about 400° C. the reaction product is poly(amino-s-triazine). When the reaction is carried out at a lower temperature, preferably in the range from room temperature to 400° C., the reaction product is the aforementioned oligomeric compound, and poly(amino-s-triazine) is obtained by heat treatment of the oligomeric compound at a temperature ranging from 400° to 600° C. It is possible to prepare poly(amino-s-triazine) higher than 10000 in molecular weight.

Poly(amino-s-triazine) is a solid having yellow or yellowish white color. Usually this polymer has a specific gravity of about 1.6–1.8 measured by toluene pycnometer and about 1.70 by helium pyconometer. These values fit to a theoretical density, 1.77 g/cm$^3$, calculated from the proposed structure (I) using C-N single bond length of 0.137 nm and C$\doteq$N conjugated bond length of 0.134 nm. This polymer is stable in the air up to a temperature near 400° C. That is, this polymer is superior in heat resistance compared with popular organic polymers. This polymer sublimes with some decomposition when heated in an inactive gas atmosphere. It is possible to deposit a thin film of this polymer on a metal, glass, ceramic or plastic surface by evaporation in vacuum or in nitrogen or an inert gas.

Poly(amino-s-triazine) has semiconductivity. For example, a film of this polymer deposited on an aluminum plate exhibited resistivity of $10^{10}$ to $10^{11}$ $\Omega$·cm in both the thickness direction and widthwise directions.

Poly(amino-s-triazine) can be produced at relatively low cost and is expected to be useful as a lubricating material, semiconductive functional material or a heat resistant polymer.

Moreover, poly(amino-s-triazine) exhibits fluorescence and has very favorable fluorescent characteristics. In particular, the fluorescence intensity of this polymer is very high when excited by UV light of 365 nm, which is used as excitation light in high-pressure mercury lamps.

For low-pressure mercury lamps which are excited at 253.7 nm, calcium halophosphates and other various fluorescent materials are in practical use. However, for high-pressure mercury lamps there are not so many kinds of practical fluorescent materials because of being required of endurance to high temperatures such as 250°–350° C. besides the efficiency of fluorescence. Conventional fluorescent materials represented by YVO$_4$:Eu$^{3+}$, BaMg$_2$Al$_{16}$O$_{27}$:Eu$_{2+}$, Mn$^{2+}$ are costly because of using expensive rare earth elements as activators. Poly(amino-s-triazine) of the invention is advantageous as a fluorescent material particularly for high-pressure mercury lamps in view of its high intensity of luminescence emission, position of the peak of emission, good thermal stability and low cost.

The aforementioned oligomeric compound obtained by reacting cyanuric trichloride with ammonia or melamine at a temperature ranging from room temperature to 400° C. is a novel compound represented by the general formula (2).

$$(C_3N_3)_a(NH)_b(NH_2)_cCl_d \qquad (2)$$

where $2 \leq a \leq 10$, $1 \leq b \leq 10$, $0 \leq c \leq 11$, and $1 \leq d \leq 12$.

This oligomeric compound has triazine rings linked two-dimensionally. This compound is a solid having white color and is stable in the air up to the temperature at which the reaction to form the compound was carried out.

As an imoportant feature the oligomeric compound exhibits strong fluorescence. When excitation is made at 365 nm the fluorescence intensity of this compound is considerably higher than that of poly(amino-s-triazine) obtained by heat treatment of the oligomeric compound. The fluorescence intensity of this compound becomes highest when the compound is formed at about 200° C.

Besides, the oligomeric compound will be useful as a lubricating material.

It is possible to convert a compound represented by the general formula (2) into another oligomeric compound represented by the general formula (2A).

$$(C_3N_3)_a(NH)_b(NH_2)_cX_d \qquad (2A)$$

where X represents at least one of Cl, F, CN, NO$_2$, OH and OM, where M is an alkali metal, and a, b, c and d are as defined above with respect to the formula (2).

That is, a compound of the general formula (2A) is obtained by partial or complete substitution of the chlorine atoms of a compound of the general formula (2). The substitution is accomplished by treating the latter compound with at least one of water, acids, alkalis, cyanates, cyanides, hydrogen fluoride and metal fluorides. The compounds of the general formula (2A) do not significantly differ from the original compound of the general formula (2) in important properties including fluorescent characteristics.

This invention includes modifications of poly(amino-s-triazine) of the general formula (1). As a first modification the invention provides polymeric compounds having a layer structure with a structural unit represented by the general formula (3):

$$C_6N_pH_qO_rM_s \qquad (3)$$

wherein M represents K, Na or Li, $5.0 \leq p \leq 10.0$, $0 < q$, $r \leq 14.0$, and $0 < s \leq 5.0$.

A polymeric compound of the general formula (3) retains the two-dimensional skeleton represented by the formula (I) and contains alkali metal atoms in the holes in that skeleton. It is presumed that the alkali metal in this compound is in the form of hydroxide and further hydrated.

A compound of the general formula (3) is obtained by reacting poly(amino-s-triazine) of the formula (1) with an aqueous solution of MOH. It is preferred to employ K as the alkali metal M.

The compounds of the general formula (3) have lubricating property, ion-exchanging property and ionic conductivity.

As a more important feature, these alkali metal containing polymeric compounds exhibit strong fluorescence. When excitation is made by UV light of 365 nm, the fluorescence intensity of these compounds is considerably higher than that of the original polymer of the general formula (1). The fluorescence intensity becomes highest when the alkali metal is potassium. Furthermore, the width of the fluorescence peak becomes narrower by the introduction of alkali metal. Accordingly the alkali metal containing compounds are useful in monochromatic fluorescence elements.

As another modification, the invention provides polymeric compounds having a layer structure with a structural unit represented by the general formula (4):

$$C_6N_iH_jO_k \qquad (4)$$

where $8.0 \leq i \leq 10.0$, $3.0 \leq j \leq 10.0$, and $1.0 \leq k \leq 4.0$.

A polymeric compound of the general formula (4) retains the fundamental structure of poly(amino-s-triazine) and has hydroxyl group.

A polymeric compound of the general formula (4) is obtained by treating poly(amino-s-triazine) with a mineral acid. The acid treatment causes lowering of molecular weight. When nitric acid is used the obtained compound has nitro group besides hydroxyl group.

A polymeric compound obtained by the acid treatment exhibits strong fluorescence. When excited at 365 nm the fluorescence intensity of this compound is considerably higher than that of the original poly(amino-s-triazine), and the width of the fluorescence peak is narrower than that of the original polymer.

Besides, the acid modified polymeric compound has lubricating property.

BRIEF DESCRIPTION OF THE DRAWINGS

FIGS. 9(A) and 9(B) show X-ray diffraction patterns of oligomeric compounds formed as intermediates of poly(amino-s-triazine) by reaction of cyanuric trichloride with ammonia at 200° C. and at 400° C., respectively;

FIGS. 10(A) and 10(B) show IR absorption spectra of the oligomeric compounds, respectively, and FIG. 10(C) shows IR absorption spectrum of cyanuric trichloride;

FIG. 11 shows ESCA spectra of the oligomeric compounds and cyanuric trichloride;

DETAILED DESCRIPTION OF THE INVENTION

Figure 2:
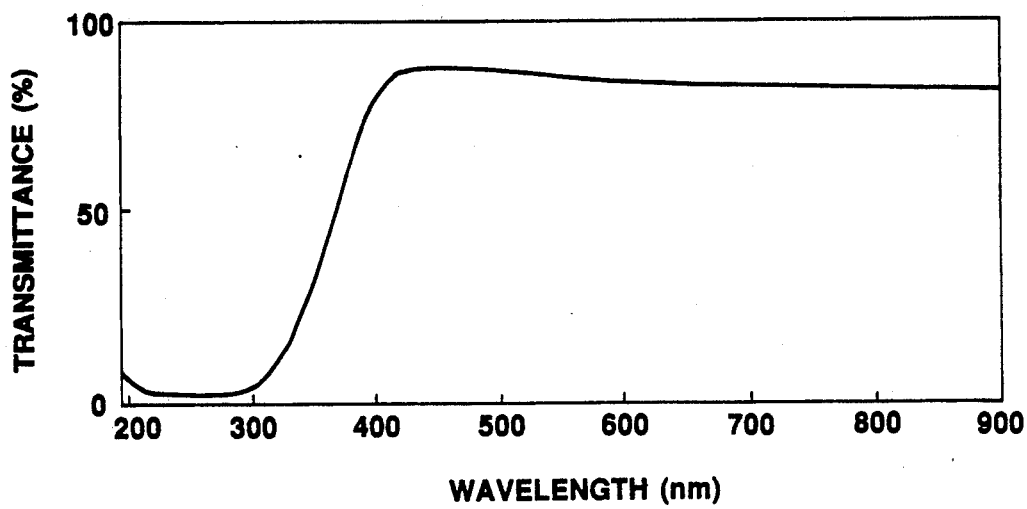
FIG. 2 shows UV spectrum of poly(amino-s-triazine)

In this invention cyanuric trichloride and either ammonia or melamine are used as reactants for preparing poly(amino-s-triazine) having a layer structure with a two-dimensional structural unit represented by the general formula (1). The particulars of the reaction of cyanuric trichloride with ammonia are as follows.

Cyanuric trichloride has a melting point of 154° C. and a boiling point of 190° C., and ammonia is a gas at room temperature. Cyanuric trichloride in solid form, in liquid form or in gas form readily undergoes reaction with ammonia gas.

When cyanuric trichloride in solid or liquid form is subjected to reaction with ammonia gas the reaction is carried out usually at temperatures ranging from room temperature to 400° C. The product of this reaction is a chlorine-containing intermediate, which is an oligomeric compound represented by the general formula (2). The aimed poly(amino-s-triazine) is obtained by heat treatment of the oligomeric compound at a temperature ranging from 400° to 600° C. in an inactive gas such as nitrogen gas for elimination of chlorine atoms together with some hydrogen atoms. The thermal stability of the intermediate depends on the temperature at which the reaction between cyanuric trichloride and ammonia is carried out and becomes higher as the reaction temperature is higher, as will further be described hereinafter. Therefore, for conversion of the intermediate into the aimed poly(amino-s-triazine) by heat treatment it is preferable to carry out the reaction to form the intermediate at temperatures not higher than 200° C. Although poly(amino-s-triazine) begins to sublime as its temperature exceeds about 390° C., the rate of sublimation is so low that the heat treatment of the intermediate at 400°-600° C. does not result in sublimation or decomposition of a large portion of the aimed compound formed by the heat treatment. Needless to mention, after completion of the conversion of the intermediate into the aimed polymer the temperature of the product is rapidly reduced to a level at which the product is stable.

In the case of reacting gasified cyanuric trichloride with ammonia gas, it is suitable to carry out the reaction at a temperature ranging from 400° to 600° C. to directly form the aimed poly(amino-s-triazine). In this case it is possible to form a film of the aimed compound on a substrate by suitably controlling the reaction conditions such as the reaction temperature and/or the rates of feed of the reactants.

In either case it is necessary to use at least 1.5 mols of ammonia per mol of cyanuric trichloride. Considering the rate of reaction and some other factors, it is preferred to use at least 4.5 mols of ammonia per mol of cyanuric trichloride. The concentration of ammonia gas used for the reaction is arbitrary, but in view of the ease of controlling the reaction it is favorable to dilute ammonia gas to 30-80 vol% with an inactive gas such as nitrogen or argon.

The particulars of the reaction between cyanuric trichloride and melamine are as follows.

Melamine is solid at room temperature and begins to sublime and decompose at about 350° C. For efficient reaction of cyanuric trichloride with melamine in solid form, it is necessary to employ a reaction temperature above the melting point of cyanuric trichloride, 154° C. Therefore, it is suitable to carry out the reaction at a temperature in the range from 154° to 350° C. In this range of temperature the reaction between cyanuric trichloride and melamine gives a chlorine-containing intermediate compound represented by the general formula (2), and the intermediate compound can be converted into the aimed poly(amino-s-triazine) by heat treatment at 400°-600° C. in an inactive gas.

It is necessary to use at least 1 mol of melamine per mol of cyanuric trichloride.

Figure 1:
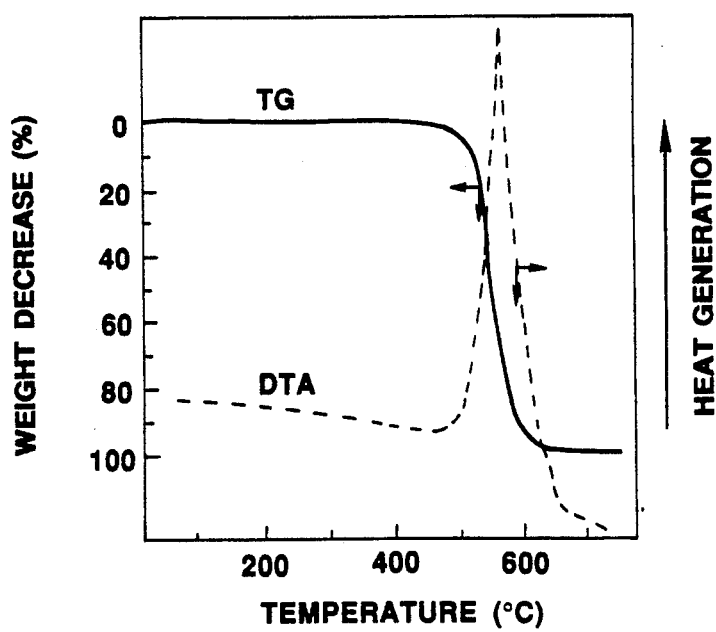
FIG. 1 is a chart showing thermal characteristics of poly(amino-s-triazine)

FIG. 1 shows the results of thermogravimetric (TG) analysis and differential thermal analysis (DTA) of a poly(amino-s-triazine) in the air. It is seen that the polymeric compound begins to thermally decompose at about 390° C. As the manner of the decomposition is oxidation decomposition the DTA curve is in an exothermic pattern.

When the same compound is heated in an inactive gas such as helium, argon or nitrogen, the compound mostly sublimes. In this case the compound does not decompose until the temperature is far raised. This is evidenced by measuring the properties of precipitates from the vapor produced by the sublimation.

By utilizing the sublimability of poly(amino-s-triazine) it is possible to form films of this compound on various substrates by vacuum evaporation or an analogous technique. FIG. 2 shows UV absorption spectrum of a poly(amino-s-triazine) film deposited on a quartz plate to a thickness of 0.15 μm. As can be seen, the film has only very weak absorption over a wide range of wavelength including most of the visible region and exhibits increasing absorption at wavelengths shorter than 430 nm to become almost opaque at 300 nm. Accordingly the film has a transparent and palely yellow appearance.

EXAMPLE 1

A quartz glass tube 40 mm in inner diameter and 1000 mm in length was used as a reactor, and 15 g of cyanuric trichloride was placed in a middle section of the tube. Outside the reaction tube, ammonia gas supplied at a rate of 50 ml/min and nitrogen gas (carrier gas) supplied at a rate of 100 ml/min were well mixed, and the mixed gas was passed through the reaction tube at a rate of 150 ml/min. The reaction tube was left at room temperature, and the gas pressure in the tube was at the atmospheric. The feed of the mixed gas was continued for 1 hr. After that the middle section of the tube was slowly heated in an electric furnace to raise the temperature in that section at a rate of 1° C./min to the extent of 400° C., and this temperature was maintained for 2 hr. The mixed gas was continuously passed through the tube while the temperature in the middle section was raised to and maintained at 400° C. After that nitrogen gas alone was passed through the tube, and the temperature in the middle section of the tube was raised to 600° C., and this temperature was maintained for 1 hr.

The above operations resulted in the formation of a yellowish white powder in the middle section of the reaction tube. The powder weighted 5 g. This powder sublimed when heated to above 400° C. in nitrogen gas stream.

Elementary analysis of the powdery compound obtained in Example 1 gave the result shown in Table 1.

Figure 3:
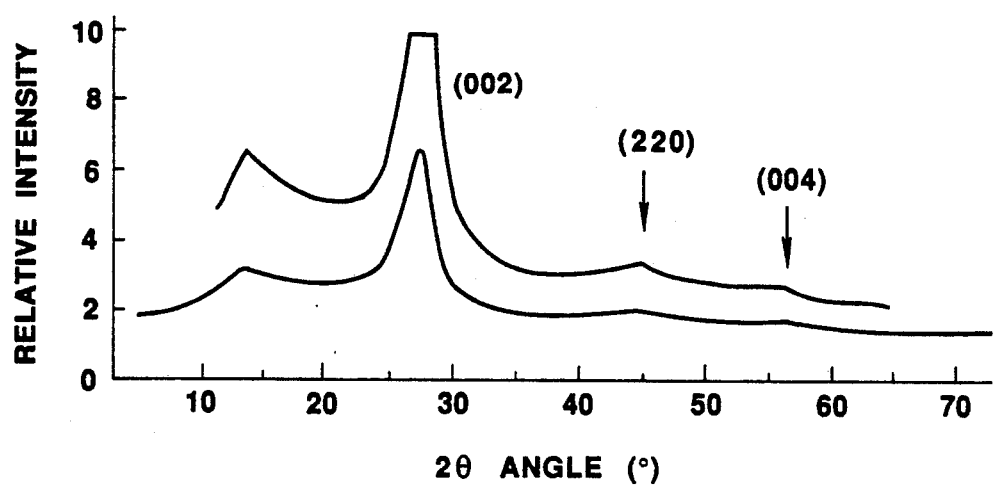
FIG. 3 shows X-ray diffraction pattern of a poly(amino-s-triazine) prepared as an example of the invention.

X-ray diffraction analysis of the powdery compound gave a diffraction pattern shown in FIG. 3. The analysis was made with Cu-Kα lines. The bulb voltage was 30 KV and the bulb current was 20 mA. The scan rate was 1°/min; the time constant was 1 sec; and the full scale of the counts was 10 Kcps. The enlarged pattern was obtained by analysis with Cu-Kα lines, operating the bulb at 40 KV and 30 mA. Also in this case the scan rate was 1°/min; the time constant was 1 sec; and the full scale was 10 Kcps.

The X-ray diffraction pattern exhibits the maximum diffracted line with a peak over $2\theta$ angles of 26.5-28.0°.

This is indicative of a distance or spacing equivalent to the van der Waals distance, d=3.3 Å, and this is close to the interlayer spacings of graphite (3.35 Å) and h-BN (3.33 Å). Besides, the weak diffracted lines around $2\theta$ angles of 44.5° and 56° are resembling the (100) and (004) diffracted lines of graphite, respectively. Thus, the X-ray diffraction pattern indicates that the analyzed compound has a layer structure resembling that of graphite.

Figure 4:
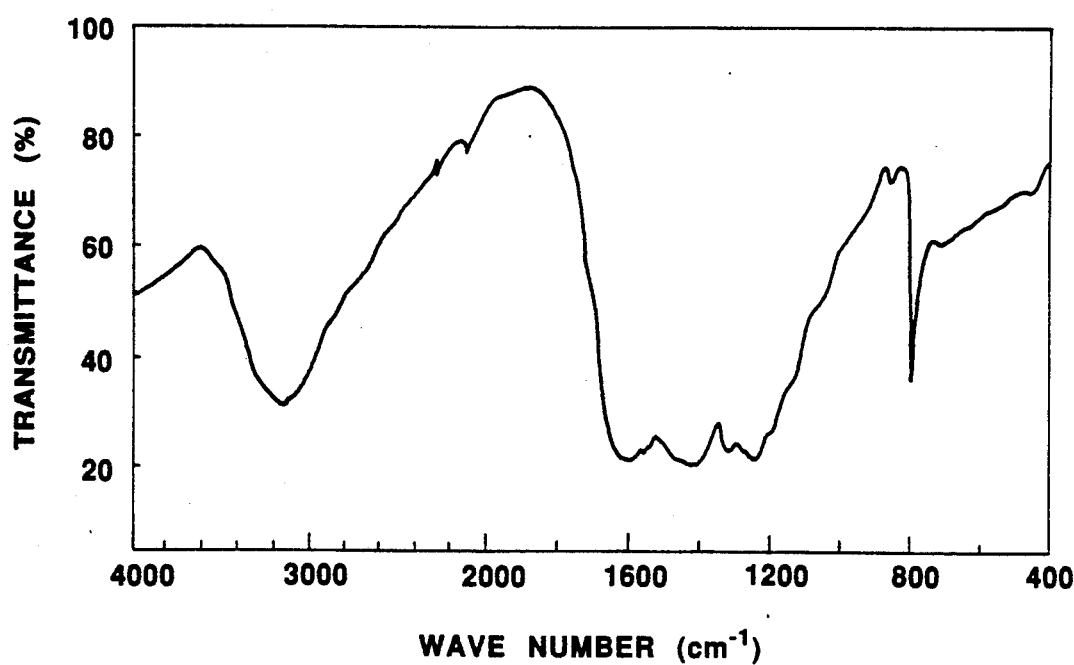
FIG. 4 shows IR absorption spectrum of the compound of the example.

FIG. 4 shows the infrared absorption spectrum of the compound obtained in Example 1. Probably the large band of absorption over 1650–1250 cm$^{-1}$ is attributed to the stretching vibration of triazine ring and the absorption at 802 cm$^{-1}$ to the deformation vibration of the same ring. That is, the IR spectrum indicates that in the obtained compound triazine ring (6-member ring of $C_3N_3$) remains undecomposed. The absorption band at 3180 cm$^{-1}$ is attributed to the stretching vibration of N—H bond. Therefore, it is probable that the analyzed compound has hydrogen atoms bonded to nitrogen atoms not contained in triazine rings.

Figure 5:
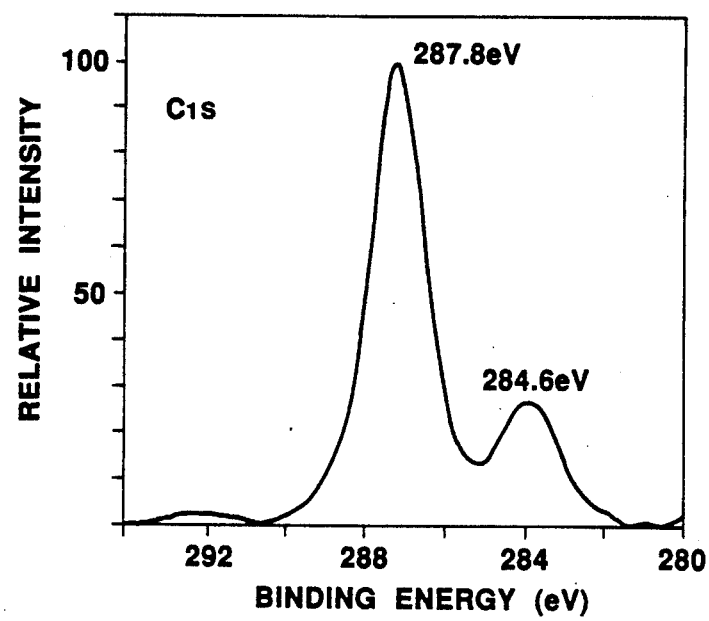
FIGS. 5 and 6 show ESCA spectra of same with respect to carbon and nitrogen, respectively.
Figure 6:
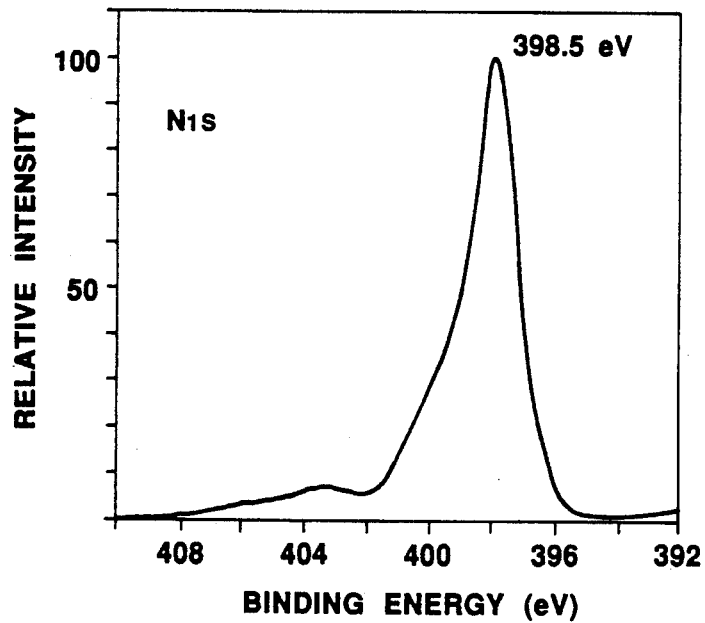

FIGS. 5 and 6 show ESCA spectra of the compound obtained in Example 1. Excitation was made by Mg-K$\alpha$ radiation. The spectrum of FIG. 5 is on the basis of $C_{1s}$ and the spectrum of FIG. 6 on the basis of $N_{1s}$. The $C_{1s}$ spectrum of FIG. 5 exhibits a sharp peak of good symmetry at 287.8 eV. The position of this peak is on the higher energy side of the peak at 284.6 eV due to C-C bond (graphite or contamination carbon). That is, the peak at 287.8 eV indicates that carbon atom was deprived of an electron by another atom higher in electronegativity, such as nitrogen atom, and is positively charged. The $N_{is}$ spectrum of FIG. 6 indicates the existence of somewhat negatively charged nitrogen atom (peak at 398.5 eV) and nitrogen atom in a slightly different state (shoulder on the higher energy side of the peak). Thus the ESCA spectra indicate a structure including two groups of nitrogen atoms different in bonds and carbon atoms all similar in bonds.

TABLE 1

| | (Elementary Analysis) | | | | |
|---|---|---|---|---|---|
| Compound | C (wt %) | N (wt %) | H (wt %) | Total (wt %) | Composition |
| Example 1 | 36.3 | 62.4 | 1.7 | 100.4 | $C_6N_{9.0}H_{3.4}$ |
| Example 2 | 35.2 | 62.7 | 2.0 | 99.9 | $C_6N_{9.2}H_{4.1}$ |
| Example 3 | 33.8 | 61.2 | 1.9 | 96.9 | $C_6N_{9.2}H_{4.0}$ |
| Example 4 | 38.3 | 62.6 | 1.6 | 102.5 | $C_6N_{8.4}H_{3.0}$ |
| Example 5 | 32.0 | 59.9 | 2.8 | 94.7 | $C_6N_{9.6}H_{6.4}$ |
| Example 6(A) | 34.2 | 59.5 | 2.0 | 95.7 | $C_6N_{9.0}H_{4.2}$ |
| Example 6(B) | 31.9 | 57.9 | 2.6 | 92.4 | $C_6N_{9.4}H_{5.8}$ |

The chemical resistance of the compound obtained in Example 1 was examined by using organic and inorganic solvents shown in Table 2. In the test, 0.3 g of the powdery compound was put into 100 ml of each solvent, and the mixture was stirred for 12 hr. After that the compound was recovered by filtration with a polytetrafluoroethylene filter (1 μm pores), dried and weighed. The degree of resistance of the compound to each solvent was judged from the amount of change in weight and any other change found by visual observation. The results are shown in Table 2.

TABLE 2

| Solvent | Weight of Recovered Compound (g) | Other Change | Evaluation |
|---|---|---|---|
| water | 0.30 | — | A |
| ethanol | 0.29 | — | A |
| diisopropyl ether | 0.30 | — | A |
| acetone | 0.29 | — | A |
| $CCl_2FCClF_2$ | 0.30 | — | A |
| benzene | 0.29 | — | A |
| pyridine | 0.30 | — | A |
| benzonitrile | 0.28 | — | A |
| tetrahydrofuran | 0.30 | — | A |
| sulfuric acid (10N) | 0 | passed through filter | C |
| nitric acid (10N) | 0.08 | passed through filter | C |
| hydrochloric acid (10N) | 0.27 | turned whitish | B |
| hydrofluoric acid (50%) | 0.30 | turned whitish | B |
| sulfuric acid (1N) | 0.27 | turned whitish | B |
| nitric acid (1N) | 0.30 | — | A |
| hydrochloric acid (1N) | 0.29 | — | A |
| sodium hydroxide solution (10N) | 0.40 | turned into solid mass by drying | C |
| aqueous ammonia | 0.30 | — | A |

A: resistant to the solvent
B: doubtful in resistance to the solvent
C: poor in resistance to the solvent

EXAMPLE 1A

The powdery compound prepared in Example 1 was evaporated in a nitrogen gas stream to deposit a film of the compound on a glass plate. The deposited film had a thickness of about 26 μm. This film was semi-transparent and exhibited transmittances of more than 30% in the 800–500 nm region of wavelength. Using a xenon lamp the film was irradiated by UV light of 365 nm, to measure the fluorescence emission spectrum of the film. The obtained spectrum exhibited strong fluorescence of blue color with a peak at 465 nm.

EXAMPLE 2

Using the same apparatus as in Example 1, 60 g of cyanuric trichloride was reacted with ammonia gas. The reaction was carried out in the same manner as in Example 1 except that the feed rate of ammonia gas was increased to 100 ml/min without varying the feed rate of nitrogen gas (100 ml/min). After the reaction at 400° C. the reaction product in the reaction tube was kept heated at 500° C. for 1 hr, while nitrogen gas alone was passed through the tube.

As the result, 23 g of a yellowish white powder was obtained. Elementary analysis of this powder gave the result shown in Table 1. This powdery compound was similar to the compound of Example 1 in physical and chemical properties, and X-ray diffraction analysis of this compound gave nearly the same result as in Example 1.

Figure 7:
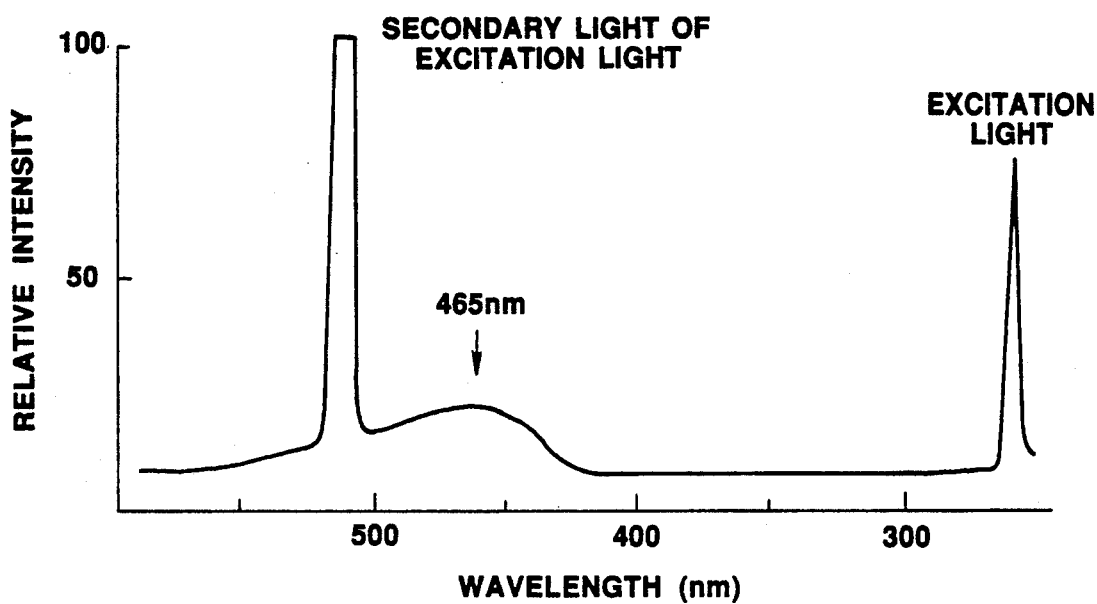
FIGS. 7 and 8 show fluorescence spectra of a poly(amino-s-triazine) measured by excitation at two different wavelengths, respectively.
Figure 8:
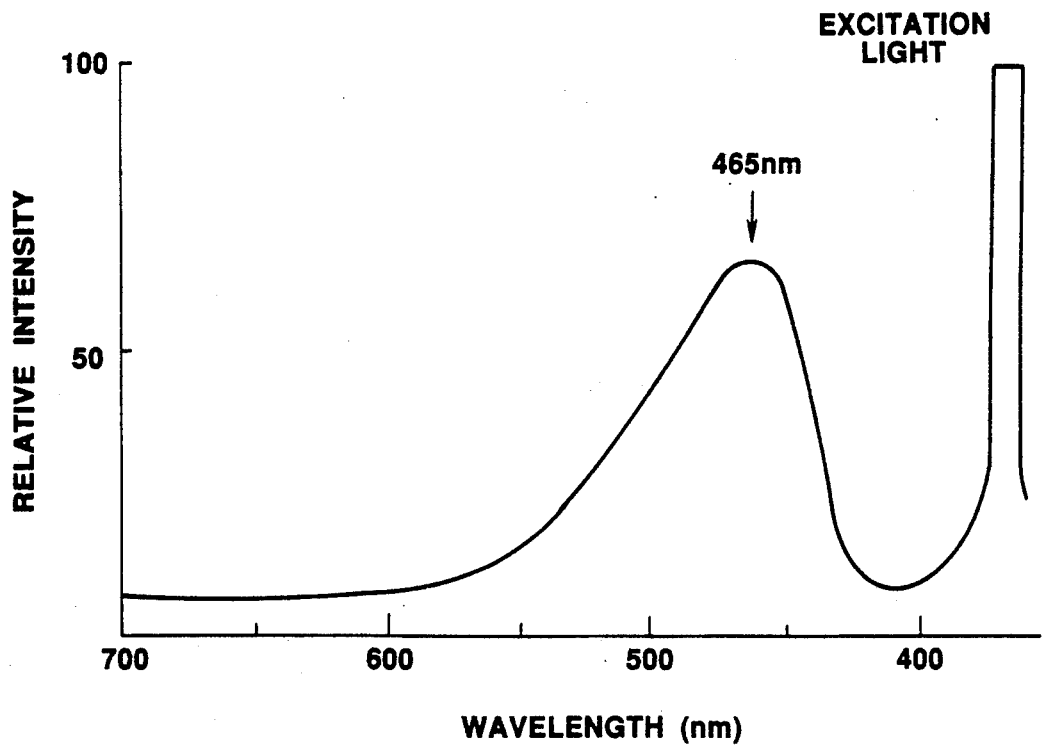

The powdery compound prepared in Example 2 was packed in a holder which had a diameter of 10 mm and was provided with a window of quartz glass. Through the window the compound in the holder was irradiated by light of 253.7 nm, which is used in low-pressure mercury lamps as excitation light, to measure the fluorescence spectrum of the compound. As shown in FIG. 7, the compound exhibited weak fluorescence with a low peak at 465 nm. Next, the same compound was irradiated by light of 365 nm used in high-pressure mercury lamps as excitation light. FIG. 8 shows the obtained fluorescence spectrum. In this case the compound exhibited strong fluorescence with a peak at 465 nm though the peak was wide in breadth.

EXAMPLE 3

A mixture of 6 g of cyanuric trichloride and 2 g of melamine was placed in a middle section of the reaction tube used in Example 1, and nitrogen gas was continuously passed through the tube. The temperature in the middle section of the reaction tube was raised at a rate of 1° C./min to the extent of 500° C., and this temperature was maintained for 1 hr. The product of the reaction was 1 g of a yellowish white powder. Elementary analysis of the obtained powder gave the result shown in Table 1. This powdery compound was almost identical with the compound obtained in Example 1 in physical and chemical properties and also in the result of X-ray diffraction analysis.

EXAMPLE 4

Using the same reaction tube as in Example 1, 15 g of cyanuric trichloride was subjected to reaction with ammonia gas. At room temperature a mixed gas of ammonia (50 ml/min) and nitrogen (100 ml/min) was passed through the reaction tube. Immediately the temperature in the middle section of the reaction tube was raised at a rate of 10° C./min up to 200° C., and this temperature was maintained for 2 hr. Then the temperature was raised to 400° C., and at this temperature the reaction was continued for 1 hr. After that the feed of ammonia gas was stopped to pass nitrogen gas alone through the tube, and the reaction product in the tube was heated up to 600° C. and maintained at this temperature for 30 min. As the result 5 g of a yellowish white powder obtained. Elementary analysis of this powder gave the result shown in Table 1. The obtained powdery compound was almost identical with the compound obtained in Example 1 in physical and chemical properties.

EXAMPLE 5

The powdery compound prepared in Example 2 was placed in a middle section of a quartz glass tube, and nitrogen gas was continuously passed through the tube. The quantity of the powdery compound was 1 g, and the flow rate of nitrogen gas was 100 ml/min. In an electric furnace the middle section of the tube was heated at a rate of 10° C./min to the extent of 700° C. As the temperature exceeded 400° C. the compound in the tube began to sublime, and from the vapor produced by the sublimation a powder precipitated in an aft section of the tube. A portion of the precipitated powder formed a film on the inner surface of the tube. Elementary analysis of the precipitated powder gave the result shown in Table 1.

EXAMPLE 6

A middle section of the quartz glass reaction tube used in Example 1 was held in an electric furnace, and 45 g of cyanuric trichloride was placed in the reaction tube in a section in front of the furnace. The middle section of the reaction tube was heated to 700° C. while nitrogen gas was passed through the tube. After that, the section containing cyanuric trichloride was heated by a ribbon heater to raise the temperature in this section at a rate of about 10° C./min to the extent of 210° C. At the same time it was commenced to introduce ammonia gas into the tube at a rate of 100 ml/min by using a nozzle inserted into the tube to react ammonia with vaporized cyanuric trichloride in the middle section of the tube. Together with ammonia gas, nitrogen gas was introduced into the tube at a rate of 200 ml/min. The gas pressure in the reaction tube was at the atmospheric pressure. The reacting operation was continued for 3 hr.

The above operation resulted in accumulation of a powder in a section of the reaction tube behind the electric furnace and deposition of a film having a thickness of about 1 mm on the inner surface of the middle section of the tube in areas near the inlet and outlet of the electric furnace. The powder and the film were each subjected to heat treatment at 500° C. Elementary analysis of the heat treated powder and film gave the results shown in Table 1, wherein Example 6(A) refers to the powder and Example 6(B) to the film. The compounds referred to as Example 6(A) and Example 6(B) were almost identical with the compound of Example 1 in physical and chemical properties.

The intermediate compound mentioned in the description of the preparation of poly(amino-s-triazine) is an olygomeric compound which is represented by the general formula (2) and has at least two triazine rings. The olygomeric compound is obtained by reacting cyanuric trichloride with ammonia gas at a temperature ranging from room temperature to 400° C. or with melamine at a temperature ranging from 154° to 350° C. The particulars of each reaction are as described hereinbefore.

When the reaction of cyanuric trichloride with ammonia gas is carried out at room temperature or a slightly higher temperature, the main reaction is the substitution of amino group for only one or two of the three chlorine atoms of cyanuric trichloride, whereas the reaction between amino group and chlorine to cause condensation of triazine rings by elimination of hydrogen chloride occurs only to a small extent. Therefore, it is preferable to carry out the reaction at a temperature above 100° C. When the reaction of cyanuric trichloride with ammonia or melamine is carried out at about 200° C. the reaction between amino group and chlorine becomes predominant, and the condensation by elimination of hydrogen chloride proceeds. When the reaction temperature is raised to near 400° C. the condensation by elimination of hydrogen chloride further proceeds. The degree of oligomerization of the obtained compound depends on the reaction temperature. When the reaction temperature is about 200° C. the product is presumed to be a mixture of several oligomers ranging from dimer to hexamer and comprising tetramer as the major component. The structure of a typical tetramer is presumed to be represented by the following formula (II).

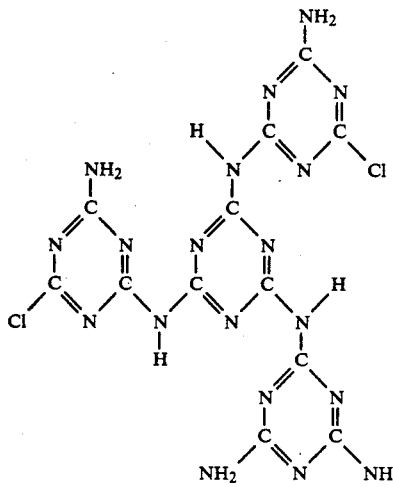

Although it is presumable that the reaction product contains oligomers of different structures possibly including linear structures, every oligomer has unsubstituted chlorine atoms in its molecule.

When the reaction temperature is near 400° C. the major component of the reaction product is octamer, and it is presumed that molecules of nearly the same size are arranged orderly compared with rather irregular arrangement of molecules in the product of reaction at about 200° C. In fact, by X-ray diffraction analysis the product of the reaction at 400° C. is better than the product of the reaction at 200° C. in sharpness of diffracted lines, as will be illustrated hereinafter.

The above described structures are deduced from the results of elementary analysis, X-ray diffraction analysis, IR absorption spectrum analysis and ESCA.

The oligomeric compounds represented by the general formula (2) exhibits fluorescence, and, particularly when excited by UV light of 365 nm, the intensity of fluorescence is far higher than that of the polymers obtained by heating these compounds to 400°-600° C.

The thermal stability of an oligomeric compound of the general formula (2) is determined by the temperature at which the reaction to form this compound is carried out. At temperatures above that reaction temperature, the oligomeric compound undergoes further condensation polymerization to turn into a polymer having a structure represented by the structural formula (I). Therefore, the oligomeric compounds formed at relatively high temperatures are relatively high in thermal stability.

An oligomeric compound which has at least two triazine rings and is represented by the general formula (2A), $(C_3N_3)_a(NH)_b(NH_2)_cX_d$ (X is at least one of Cl, F, CN, $NO_2$, OH, OM where M is an alkali metal), is obtained by reacting a compound represented by the general formula (2) with at least one of water, mineral acids, alkalis, cyanic acid, cyanates, cyanides, hydrogen fluoride and metal fluorides for entirely or partially substituting chlorine atoms of the latter compound. A compound represented by the general formula (2A), assuming that X is not Cl, does not significantly differ from the original compound represented by the general formula (2) in important properties including fluorescent characteristics.

EXAMPLE 7

Using the same apparatus as in Example 1, 56 g of cyanuric trichloride was placed in the middle section of the reaction tube. Outside the reaction tube, ammonia gas supplied at a rate of 50 ml/min and nitrogen gas supplied at a rate of 100 ml/min were well mixed, and the mixed gas was passed through the reaction tube at a rate of 150 ml/min. The gas pressure in the tube was at the atmospheric.

In the first run, the reaction tube was left at room temperature. In the second and third runs the middle section of the reaction tube was kept heated at 200° C. and at 400° C., respectively. In every run the feed of the mixed gas was continued until the consumption of ammonia in the reaction tube terminated. After the reaction ammonium chloride formed by the reaction was removed by dissolving in water, and unreacted cyanuric trichloride was removed by dissolving in acetone. Probably the treatment with water caused partial substitution of chlorine atoms in the reaction product by hydroxyl group.

The reaction at room temperature gave 8.4 g of 2-chloro-4,6-diamino-s-triazine and 27.5 g of an acetone soluble mixture which was mostly 2-amino-4,6-dichloro-s-triazine and contained small amounts of slightly condensed compounds.

The product of the reaction at 200° C. was 24.8 g of a white powder which was stable in the air and insoluble in water and acetone. The product of the reaction at 400° C. was 42.0 g of a palely yellowish white powder which was stable in the air and insoluble in water and acetone.

Table 3 shows the results of elementary analysis of the powdery compounds formed at 200° C. and 400° C., respectively. Table 4 shows theoretical compositions of various oligomers represented by the general formula $(C_3N_3)_a(NH)_b(NH_2)_cCl_d$. Comparing the analytical results with the data in Table 4, the compound formed by the reaction at 200° C. was estimated to be mostly in the form of tetramer and the compound formed at 400° C. to be mostly in the form of cyclic octamer.

TABLE 3

| Reaction Temperature | (Elementary Analysis) | | | |
|---|---|---|---|---|
| | C (wt %) | N (wt %) | H (wt %) | Cl (wt %) |
| 200° C. | 26.3 | 53.3 | 3.9 | 16.5 |
| 400° C. | 29.8 | 58.3 | 3.3 | 8.8 |

TABLE 4

| | (Theoretical Compositions) | | | | |
|---|---|---|---|---|---|
| Oligomer | Formula | Composition (wt %) | | | |
| | | C | N | H | Cl |
| dimer | $(C_3N_3)_2(NH)(NH_2)_3Cl$ | 28.3 | 55.0 | 2.8 | 13.9 |
| trimer | $(C_3N_3)_3(NH)_2(NY_2)_3Cl_2$ | 28.2 | 51.2 | 2.1 | 18.5 |
| tetramer | $(C_3N_3)_4(NH)_3(NH_2)_4Cl_2$ | 29.3 | 54.1 | 2.2 | 14.4 |
| pentamer | $(C_3N_3)_5(NH)_4(NH_2)_4Cl_3$ | 29.0 | 51.9 | 1.9 | 17.1 |
| hexamer, linear | $(C_3N_3)_6(NH)_5(NH_2)_5Cl_3$ | 29.6 | 53.7 | 2.1 | 14.6 |
| hexamer, linear | $(C_3N_3)_6(NH)_5(NH_2)_6Cl_2$ | 30.4 | 57.2 | 2.4 | 10.0 |
| hexamer, cyclic | $(C_3N_3)_6(NH)_6(NH_2)_3Cl_3$ | 30.3 | 53.1 | 1.7 | 14.9 |
| hexamer, cyclic | $(C_3N_3)_6(NH)_6(NH_2)_4Cl_2$ | 31.1 | 56.6 | 2.0 | 10.2 |
| heptamer, linear | $(C_3N_3)_7(NH)_6(NH_2)_7Cl_2$ | 30.8 | 58.1 | 2.4 | 8.7 |
| heptamer, cyclic | $(C_3N_3)_7(NH)_7(NH_2)_5Cl_2$ | 31.4 | 57.6 | 2.1 | 8.9 |

TABLE 4-continued

| | | (Theoretical Compositions) | | | |
|---|---|---|---|---|---|
| | | Composition (wt %) | | | |
| Oligomer | Formula | C | N | H | Cl |
| octamer, linear | $(C_3N_3)_8(NH)_7(NH_2)_8Cl_2$ | 31.0 | 58.8 | 2.5 | 7.7 |
| octamer, cyclic | $(C_3N_3)_8(NH)_8(NH_2)_6Cl_2$ | 31.6 | 58.4 | 2.2 | 7.8 |
| nonamer, cyclic | $(C_3N_3)_9(NH)_9(NH_2)_6Cl_3$ | 31.2 | 56.6 | 2.0 | 10.2 |
| decamer, cyclic | $(C_3N_3)_{10}(NH)_{10}(NH_2)_7Cl_3$ | 31.3 | 57.3 | 2.1 | 9.3 |

FIGS. 9(A) and 9(B) show X-ray diffraction patterns of the products of the reactions at 200° C. and the reaction at 400° C., respectively. The method and conditions of the X-ray diffraction analysis were as described in Example 1.

The diffraction pattern of FIG. 9(A) exhibits the maximum diffracted line with a peak over 2 $\theta$ angles of 26.5°-28.0°. This is attributed to a distance equivalent to the van der Waals distance, d=3.3 Å, and this distance is close to the interlayer spacing of graphite (3.35 Å) or h-BN (3.33 Å). Except this peak the diffraction pattern has few peaks. Therefore, it is presumable that the product of the reaction at 200° C. is a mixture of several kinds of polymers having triazine rings in irregular arrangements in the two-dimensional directions.

In contrast the X-ray diffraction pattern of FIG. 9(B) is very intricate and has many sharp peaks. Therefore, it is presumable that in the product of the reaction at 400° C. the oligomer molecules having triazine rings are nearly uniform in molecular weight and in a regular arrangement in the two-dimensional directions, so that the diffraction pattern includes diffracted lines attributed to the lattice distances in the plane of the network of the rings.

FIGS. 10(A) and 10(B) show IR absorption spectra of the products of the reactions at 200° C. and at 400° C., respectively, and FIG. 10(C) shows IR absorption spectrum of cyanuric trichloride. In both FIGS. 10(A) and 10(B) the broad absorption band over 1650–1250 cm$^{-1}$ is probably attributed to the stretching vibration of the C—N and C=N bonds of triazine ring, and the absorption band at 800–810 cm$^{-1}$ to the deformation vibration of the same ring. Therefore, it is evident that in the reaction products triazine ring remains undecomposed. The spectrum of FIG. 10(A) exhibits absorption by —NH$_2$ at 3333 cm$^{-1}$ besides absorption by N—H at 3143 cm$^{-1}$ and, hence, indicates that the product of the reaction at 200° C. has considerable numbers of —NH$_2$ groups as terminal groups. In the spectrum of FIG. 10(B) the absorption band of —NH$_2$ has diminished. This is an evidence that the product of the reaction at 400° C. is higher in the degree of polymerization with resultant decrease in the number of —NH$_2$ groups at terminals.

FIG. 11 shows ESCA spectra of the products of the reactions at 200° C. and at 400° C. (at (A) and (B), respectively) and cyanuric trichloride (at (C)). Excitation was made by Mg-K$\alpha$ radiation. In cyanuric trichloride both carbon atoms and nitrogen atoms are in a positively polarized state by the influence of electron attractive chlorine radicals. Therefore, either of the $C_{1s}$ and $N_{1s}$ spectra of this compound has a peak on the higher energy side. The $N_{1s}$ spectrum of each reaction product has shifted to the lower energy side to have a peak at 398.5 eV, which means resemblance to the spectrum of melamine. In the $N_{1s}$ spectrum of the product of the reaction at 200° C. the half-width of the peak is very large. Presumably this is because of overlapping of the peak attributed to nitrogen in triazine ring (on the lower energy side: 398.5 eV) with the peak attributed to nitrogen of —NH$_2$ group (on the higher energy side: 399.4 eV). In the $N_{1s}$ spectrum of the product of the reaction at 400° C. the half-width of the peak becomes smaller because of diminution of the peak on the higher energy side. Such a difference between the two $N_{1s}$ spectra agrees with the difference between the IR spectra of FIGS. 10(A) and 10(B).

Figure 12:
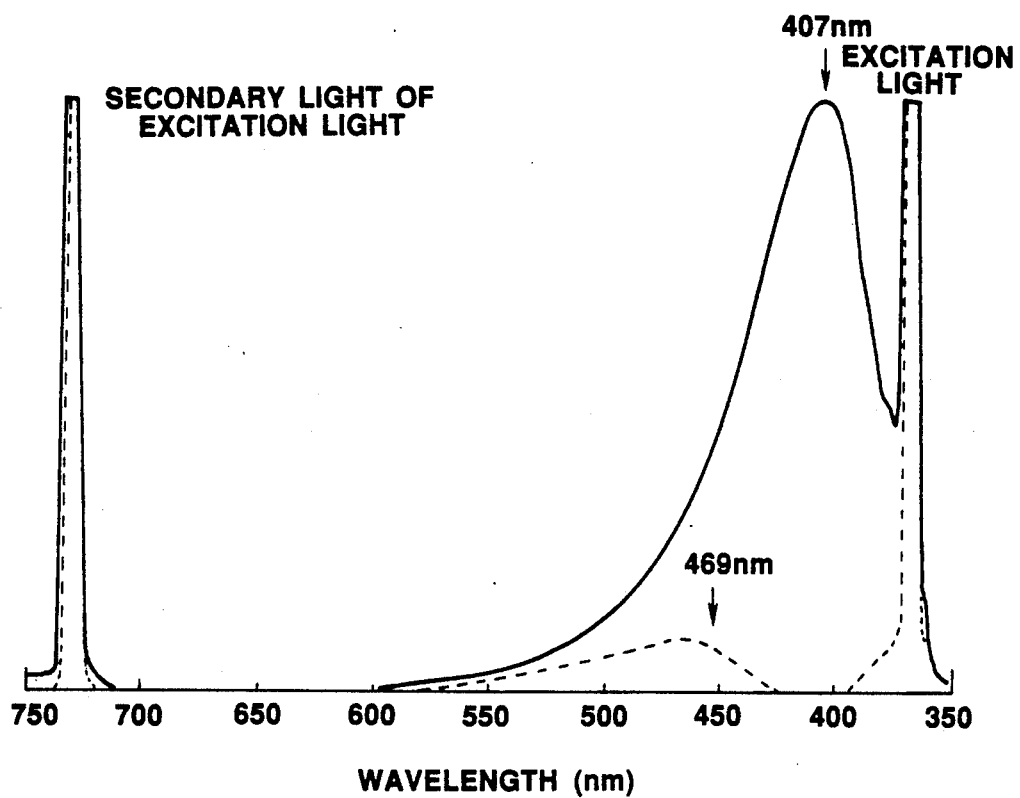
FIG. 12 shows fluorescence spectra of the oligomeric compounds.

The powdery product of the reaction at 200° C. was packed in a holder which had a diameter of 10 mm and was provided with a window of quartz glass. Through the window and using a xenon lamp with a slit 1.5 nm in width, the powder in the holder was irradiated by UV light of 365 nm to measure the fluorescence emission spectrum of the powder. FIG. 12 shows the obtained fluorescence spectrum (the curve (A) in solid line). As can be seen the reaction product exhibited fluorescence with a very high peak at 407 nm.

The product of the reaction at 400° C. was tested by the same method. This product exhibited fluorescence with a high peak at 422 nm. For reference, the same reaction product was subjected to heat treatment in nitrogen gas at 500° C. for 1 hr, and the heat treated product was tested by the same method. In this case the fluorescence spectrum was as shown in FIG. 12 by the curve (B) in broken line. The heat treatment resulted in considerable lowering of the fluorescence intensity, but the heat treated product was comparable to calcium halophosphates in fluorescence intensity.

Figure 13:
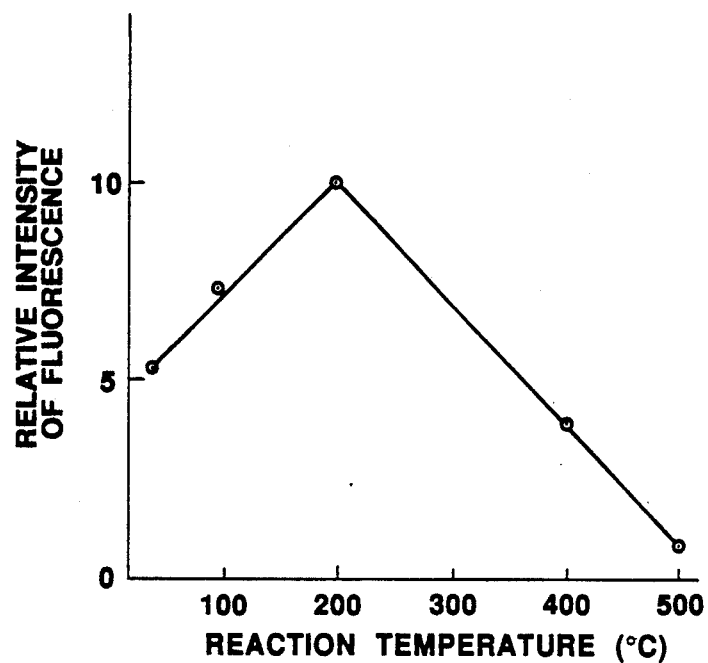
FIG. 13 is a graph showing the relationship between the temperature at which cyanuric trichloride is reacted with ammonia and the fluorescence intensity of the obtained polymeric compound.

In Example 7 cyanuric trichloride was reacted with ammonia gas at room temperature, at 200° C. and at 400° C., and a portion of the product of the reaction at 400° C. was heat treated at 500° C. as mentioned above. As described hereinbefore, the heat treated product was a poly(amino-s-triazine) free of chlorine. As a supplement cyanuric trichloride was reacted with ammonia gas at 100° C. by the same method. From the fluorescence spectra of these reaction products (excited at 365 nm), the relationship between the reaction temperature and the fluorescence intensity was deduced to be as shown in FIG. 13. It is apparent that the chlorine containing products formed at temperatures ranging from room temperature to 400° C. are higher in the fluorescence intensity than the product treated at 500° C. In particular the product of the reaction at 200° C. exhibits fluorescense of very high intensity (about 7.5 times the intensity of the product treated at 500° C.). The reason for such high fluorescence intensity of the product of the reaction at 200° C. has not been elucidated, though it is presumable that the reason has connection with the electron structure of the compounds formed by the reaction, such as resonance of $\pi$-electrons.

Figure 14:
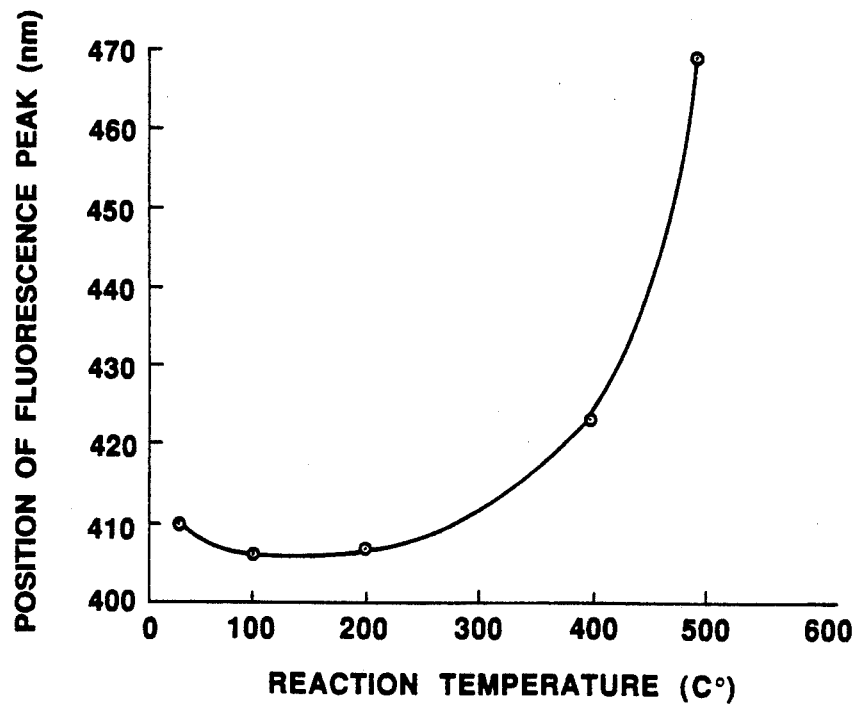
FIG. 14 is a graph showing the relationship between the aforementioned reaction temperature and the wavelength at which the fluorescence emission of the obtained polymeric compound peaks.

With respect to the same reaction products, FIG. 14 shows the relationship between the reaction temperature and the position of the fluorescence peak of the reaction product. It is apparent that the position of the peak shifts to the longer wavelength side as the reaction temperature is made higher.

EXAMPLE 8

A mixture of 1 g of cyanuric trichloride and 0.7 g of melamine was placed in the middle section of the reaction tube used in Example 1, and the middle section of the tube was kept heated at 200° C. for 1 hr while nitrogen gas was passed through the tube. The product of the reaction was 0.5 g of a white powder. From the results of elementary analysis, X-ray diffraction analysis and IR absorption analysis, the reaction product was determined to be a mixture of a small amount of unreacted melamine and oligomeric compounds almost similar to the product of the reaction at 200° C. in Example 7.

From a poly(amino-s-triazine), a polymeric compound having a layer structure with a structural unit represented by the general formula (3), $C_6N_pH_qO_rM_s$ (M is K, Na or Li) is obtained by reacting the polymer with an aqueous solution of MOH. KOH is preferred as MOH. It is suitable that the concentration of MOH in the solution is in the range from 0.1 to 10 mol/l. When the concentration is below 0.1 mol/l the alkali metal M is not easily introduced into the starting polymer. It is difficult to prepare an aqueous solution containing more than 10 mol/l of MOH. In the case of aqueous solution of LiOH it is impossible to increase the concentration beyond 1.25 mol/l.

The reaction is accomplished by simply stirring a mixture of poly(amino-s-triazine) and an aqueous solution of MOH. For uniform mixing and uniform reaction it is suitable to mix 1 to 30 g of the polymer with 1 liter of MOH solution. The reaction temperature is not strictly limited, but it is preferred to carry out the reaction at or around room temperature. The reaction is completed by stirring the mixture for 0.5 to 24 hr. The alkali treated product is recovered by filtration and washed until disappearance of alkalinity. The washed product is dried at a temperature of about 100° C. or below.

The compound obtained by the above alkali treatment has a structure represented by the following structural formula (III), which is derived from the results of elementary analysis, X-ray diffraction analysis, IR absorption spectrum analysis and fluorescence spectrum analysis.

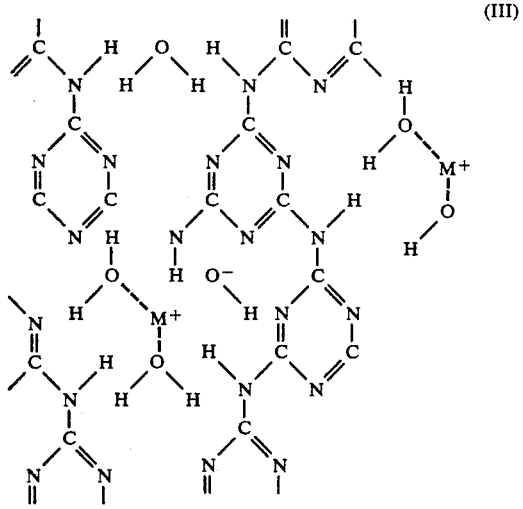

(III)

This structural formula shows that the layer structure of poly(amino-s-triazine), viz. a stack of planar layers each comprised of a number of s-triazine rings linked to each other by —NH—, is retained and that alkali metal ions $M^+$ have entered the holes in each layer of the fundamental structure. In the unit cell of the two-dimensional structure of each layer of poly(amino-s-triazine) there is a large hole 0.394 nm in diameter, and it is presumable that K ion (0.304 nm in diameter), Na ion (0.226 nm in diameter) or Li ion (0.146 nm in diameter) is introduced into the hole. As an evidence of this presumption, X-ray diffraction patterns indicate that the layer structure of poly(amino-s-triazine) does not change by reaction with a MOH solution and that the interlayer spacing does not change either. The modified polymer contains oxygen and is higher in the content of hydrogen than the original polymer. Therefore, it is presumable that in the modified polymer the alkali metal M is in the form of hydorxide and is further hydrated. Since X-ray diffraction patterns of the modified polymer indicate broadening of diffracted lines, it is certain that the modified polymer is lower in crystallinity than the original polymer. A presumable reason is that the uniformity of the interlayer spacings is somewhat marred by the introduction of water of hydration.

The modified polymeric compounds obtained by treatment with MOH solution are stable in the air. However, the modified polymers are inferior to the original polymers in thermal stability. For example, when a poly(amino-s-triazine) which is stable up to about 400° C. is modified, the modified polymer is not stable at temperatures above 200° C. and begins to decompose at about 300° C. with a change in color from white to yellow.

As mentioned hereinbefore, the modification of poly(amino-s-triazine) by the introduction of an alkali metal has the effect of greatly enhancing the fluorescence intensity and narrowing the width of the fluorescence peak. In this respect it is best to choose potassium among alkali metals.

EXAMPLE 9

To introduce potassium into the powdery poly(amino-s-triazine) prepared in Example 2, 0.3 g of the polymer powder was put into 100 ml of 1N aqueous solution of KOH, and the mixture was stirred for 12 hr at room temperature. Then the powder was recovered by filtration, washed and dried at about 100° C. By this treatment the yellowish color of the poly(amino-s-triazine) powder turned whitish.

Elementary analysis of the polymer obtained by the above treatment gave the result shown in Table 5. The composition of this polymer was determined to be $C_6N_{8.7}H_{7.9}O_{3.9}K_{1.0}$, which means that potassium and oxygen were introduced into the starting polymer, $C_6N_{9.2}H_{4.1}$, accompanied by an increase in the content of hydrogen. Therefore, it is presumable that potassium in the obtained polymer is in the form of hydrated KOH. The composition determined by elementary analysis nearly agrees with the theoretical composition $C_6N_9H_8O_3K$ deduced from the assumption that $KOH.2H_2O$ is introduced into the unit cell of the ideal structure of poly(amino-s-triazine), $[(C_3N_3)_2(NH)_3]_n$.

Figure 15:
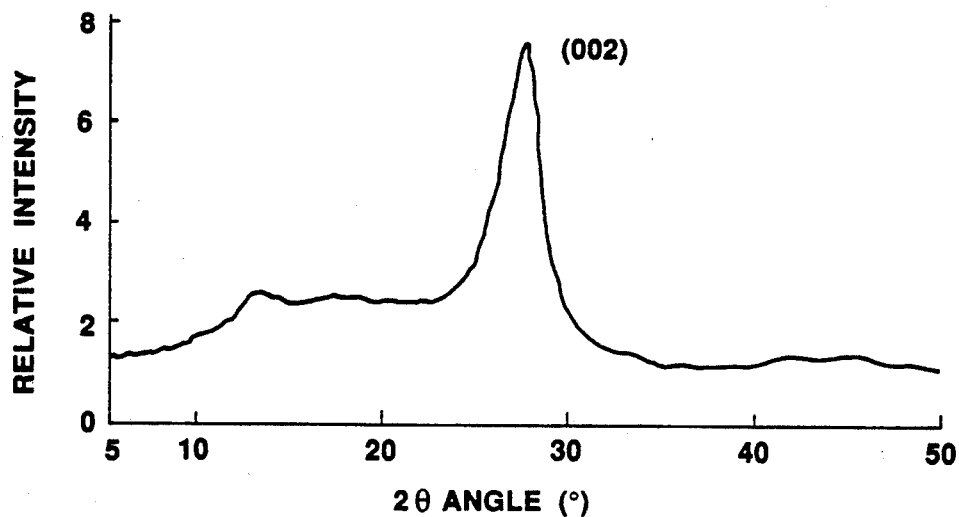
FIGS. 15 and 16 show X-ray diffraction patterns of a poly(amino-s-triazine) and a modified polymer obtained by treatment with potassium hydroxide solution, respectively.
Figure 16:
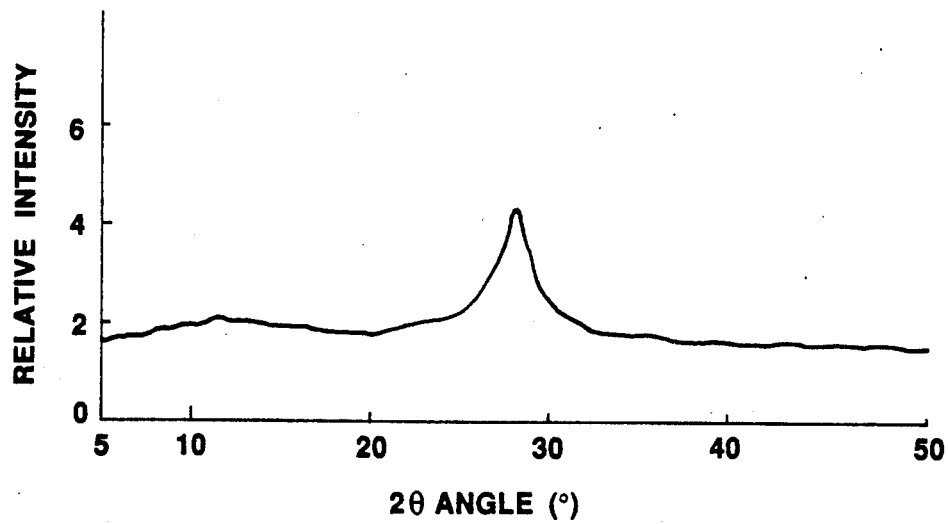

FIGS. 15 and 16 show X-ray diffraction patterns of the poly(amino-s-triazine) used as the starting material in Example 9 and the potassium containing polymer obtained in Example 9, respectively. The method and conditions of the X-ray diffraction analysis were as described in Example 1. The diffraction pattern of FIG. 16 too exhibits the maximum diffracted line with a peak over $2\theta$ angles of 26.5°–28.0°. This is an evidence that the fundamental structure of the starting polymer, viz. graphite-like layer structure, does not change by the treatment with the KOH solution. However, the alkali treatment caused broadening of the diffracted lines, which indicates lowering of crystallinity. Presumably this is because the interlayer spacings become somewhat irregular by the introduction of water of hydration.

Figure 17:
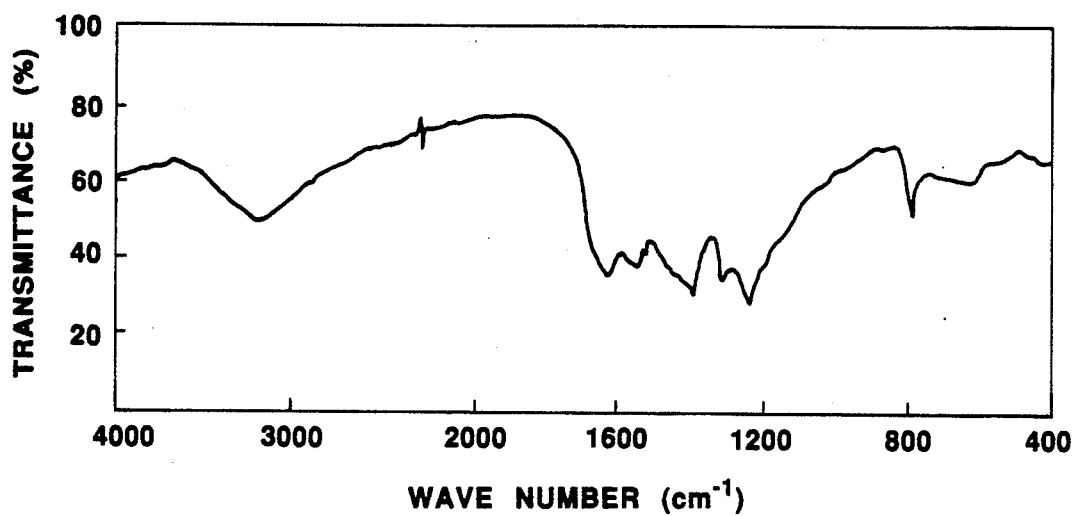
FIGS. 17 and 18 show IR absorption spectra of the poly(amino-s-triazine) and the modified polymer, respectively.
Figure 18:
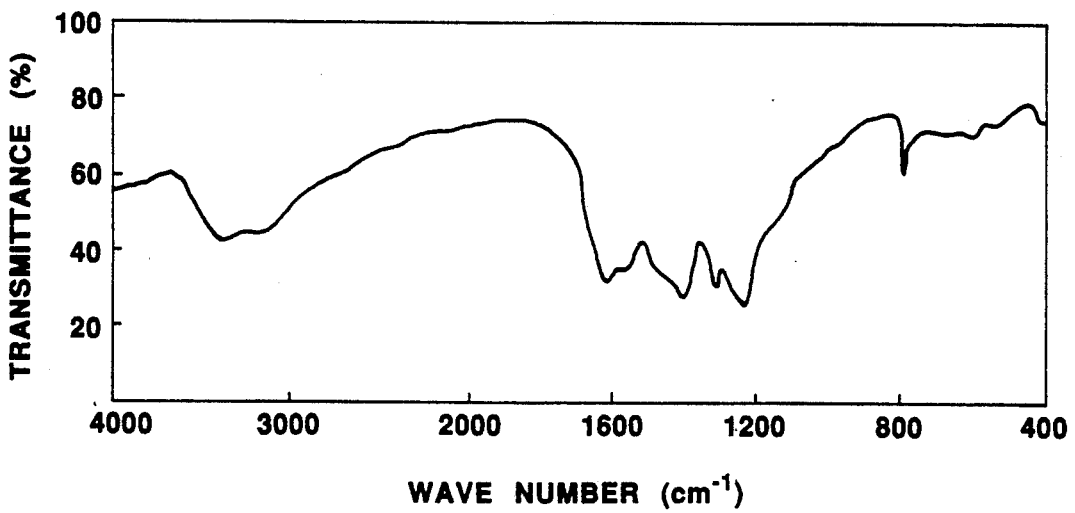

FIGS. 17 and 18 show IR absorption spectra of the starting polymer in Example 9 and the potassium containing polymer obtained in Example 9, respectively. In either of these spectra the absorption band at 3200 cm$^{-1}$ is attributed to the stretching vibration of —NH— group in the structure of poly(amino-s-triazine). Besides, in the spectrum of the alkali treated polymer there appears an absorption band at 3400 cm$^{-1}$, which is attributed to —OH group and water of hydration.

Figure 19:
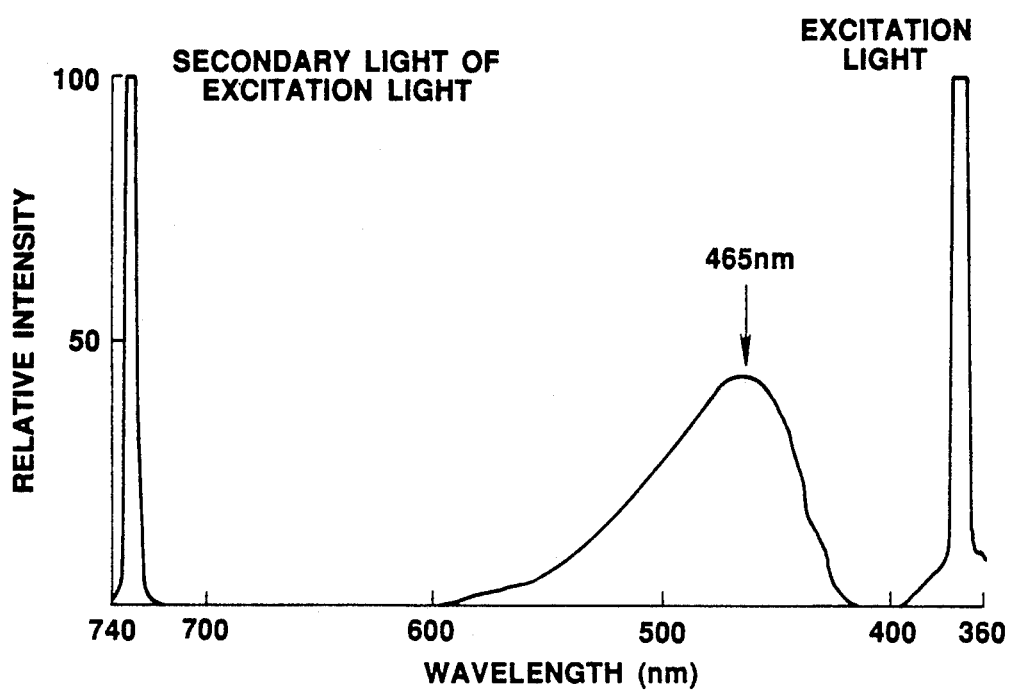
FIGS. 19 and 20 show fluoresecence spectra of the poly(amino-s-triazine) and the modified polymer, respectively.
Figure 20:
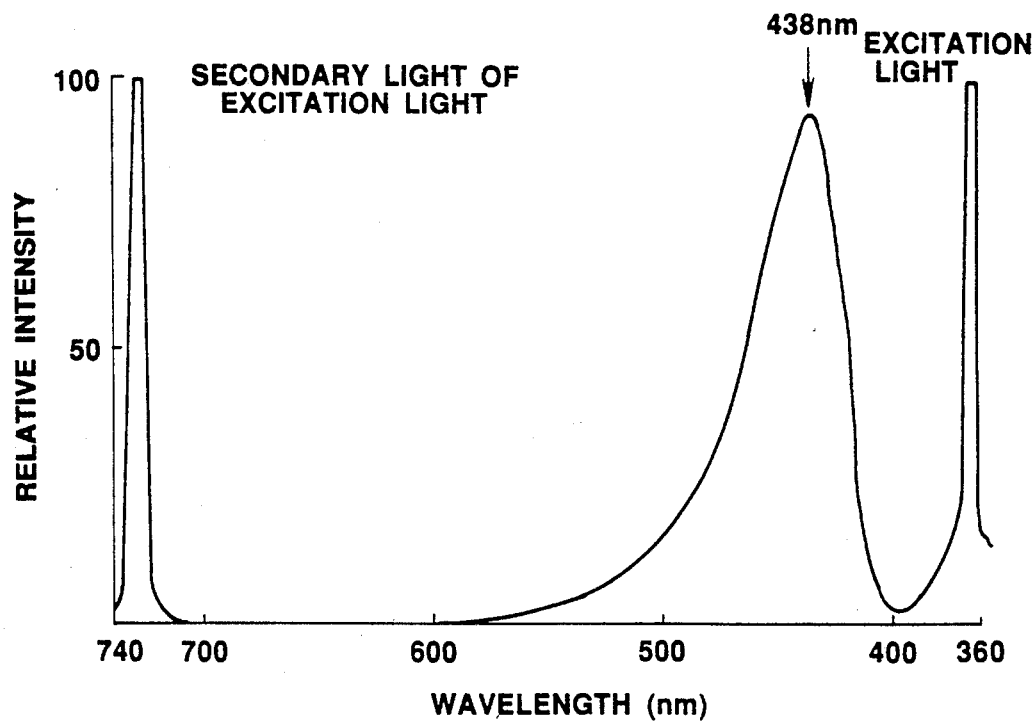

FIGS. 19 and 20 show fluorescence spectra of the starting polymer in Example 9 and the potassium containing polymer obtained in Example 9, respectively. Excitation was made by UV light of 365 nm. The polymer before the treatment exhibits strong fluorescence with a peak at 465 nm. As can be seen in FIG. 20, the potassium containing polymer exhibits still stronger fluorescence. The fluorescence intensity of this polymer is more than 2 times the intensity of the starting polymer. Besides, the width of the peak has narrowed and the position of the peak has shifted to 438 nm. This polymer emitted blue light.

EXAMPLE 10

The treatment of Example 9 was repeated except that the concentration of KOH solution was increased to 10N.

The alkali treated product was more whitish than the product of Example 9 and partly dissolved in the KOH solution to pass through 1 μm filter. Elementary analysis of the undissolved product gave the result shown in Table 5. The composition of this product was $C_6N_{5.6}H_{13}O_{12}K_{3.4}$. Considerable amounts of potassium and oxygen were introduced, and, comparing with the starting polymer, the content of nitrogen greatly decreased whereas the content of hydrogen increased. Considering the composition and partial dissolution of the product it is presumable that the treatment with the concentrated alkali solution caused breaking of the bonds of —NH— group and resultant lowering of molecular weight.

EXAMPLE 11

The treatment of Example 9 was repeated except that the concentration of KOH solution was decreased to 0.1N. In this case the treated product was nearly similar in color to the starting polymer. The result of elementary analysis is shown in Table 5. The composition of the treated product was $C_6N_{9.3}H_{4.2}O_{0.61}K_{0.11}$.

Figure 21:
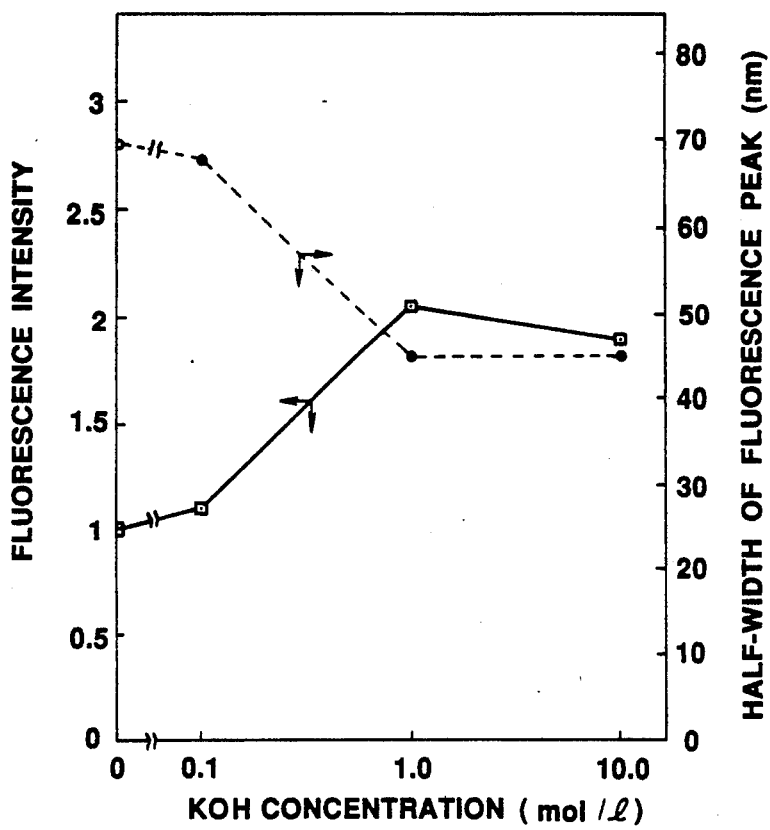
FIG. 21 is a graph showing the dependence of the fluorescence intensity and the half-width of the fluorescence peak of the modified polymer on the concentration of the potassium hydroxide solution.

With respect to the potassium containing polymers prepared in Examples 9–11, FIG. 21 shows the influence of the concentration of KOH solution used for the treatment of poly(amino-s-triazine) on the fluorescence intensity and the half-width of the fluorescence peak of the product. As can be seen, the fluorescence intensity maximizes and the half-width of the peak minimizes when 1N solution of KOH is used, and it is inefficacious to further increase the concentration of KOH solution.

EXAMPLE 12

The alkali treatment of Example 9 was modified by using 1N aqueous solution of NaOH in place of the KOH solution. The treating method was unchanged. The treated product was slightly whitish compared with the starting polymer. The result of elementary analysis is shown in Table 5. The composition of the product was $C_6N_{8.4}H_{5.0}O_{0.83}Na_{0.47}$. That is, the content of Li in this product was less than the content of K in the product of Example 9.

EXAMPLE 13

The alkali treatment of Example 9 was modified by using 1N aqueous solution of LiOH in place of the KOH solution. The treating method was unchanged. The treated product was nearly similar in color to the starting polymer. The result of elementary analysis is shown in Table 5. The composition of the product was $C_6N_{9.2}H_{4.2}O_{0.49}Li_{0.10}$. That is, the content of Li in this product was still less than the content of Na in the product of Example 12.

TABLE 5

| | \multicolumn{5}{c|}{Elementary Analysis (wt %)} | |
|---|---|---|---|---|---|---|
| | C | N | H | (O) | M | Composition |
| starting polymer | 35.2 | 62.7 | 2.0 | — | — | $C_6N_{9.2}H_{4.1}$ |
| Ex. 9 | 23.6 | 39.9 | 2.6 | 20.6 | 13.3 | $C_6N_{8.7}H_{7.9}O_{3.9}K_{1.0}$ |
| Ex. 10 | 14.7 | 16.1 | 2.6 | 39.4 | 27.2 | $C_6N_{5.6}H_{13}O_{12}K_{3.4}$ |
| Ex. 11 | 32.7 | 59.1 | 1.9 | 4.4 | 1.9 | $C_6N_{9.3}H_{4.2}O_{0.61}K_{0.11}$ |
| Ex. 12 | 32.9 | 53.8 | 2.3 | 6.1 | 4.9 | $C_6N_{8.4}H_{5.0}O_{0.83}Na_{0.47}$ |
| Ex. 13 | 33.7 | 60.3 | 2.0 | 3.7 | 0.3 | $C_6N_{9.2}H_{4.2}O_{0.49}Li_{0.10}$ |

(O): the remainder of subtraction of the contents of C, N, H and M from 100%.
M: K in Examples 9–11, Na in Example 12, Li in Example 13.

From a poly(amino-s-triazine), a compound having a layer structure with a structural unit represented by the general formula (4), $C_6N_iH_jO_k$, is obtained by reacting the polymer with a mineral acid. As the acid it is possible to use nitric acid, hydrochloric acid, hydrofluoric acid or sulfuric acid. In any case it is suitable to use an aqueous solution of the acid in a concentration higher than 1N. When the acid concentration is 1N or below the treatment with the acid solution does not cause appreciable changes in the composition and structure of poly(amino-s-triazine), though even in such a case the acid treated polymer exhibits a slight rise in the fluorescence intensity. By treatment with an acid solution of 5 to 10N, considerable changes occur in the composition, X-ray diffraction patterns and IR absorption spectra, and the polymeric compound obtained by the acid treatment exhibits greatly and favorably modified fluorescent characteristics as mentioned hereinbefore and as will be illustrated hereinafter.

The reaction of poly(amino-s-triazine) with a mineral acid can be accomplished by simply stirring a mixture of the polymer and an acid solution. For uniform mixing and uniform reaction, it is suitable to mix not more than 30 g of the polymer with 1 liter of acid solution. The reaction temperature is arbitrary, but it is favorable for practical operations to carry out the acid treatment at or around room temperature. The reaction is completed by stirring the mixture of the starting polymer and acid solution for 0.5 to 24 hr. The acid treated product is recovered by filtration and washed until the filtrate becomes neutral. The washed product is dried at a temperature of about 100° C. or below until the weight becomes constant. Usually the compound obtained by the acid treatment assumes a white color, whereas the polymer before the treatment assumes a yellow or yellowish white color.

EXAMPLE 14

To modify a poly(amino-s-triazine) having the structural unit represented by $(C_3N_3)_2N_{3.3}H_{4.8}$ by providing —OH group thereto, 0.3 of the polymer was put into 100 ml of 10N aqueous solution of nitric acid, and the mixture was stirred for 12 hr at room temperature. The treated polymer was recovered by filtration, washed and dried at about 100° C. By this treatment the yellowish color of the poly(amino-s-triazine) changed into white color. Elementary analysis of the treated product gave the result shown in Table 6. The composition of this product was determined to be $C_6N_{9.8}H_{8.0}O_{2.8}$. This product partly dissolved in the acid solution and passed through the filter having 1 μm pores. This is indicative that the acid treated product was lower in molecular weight than the starting polymer.

Figure 22:
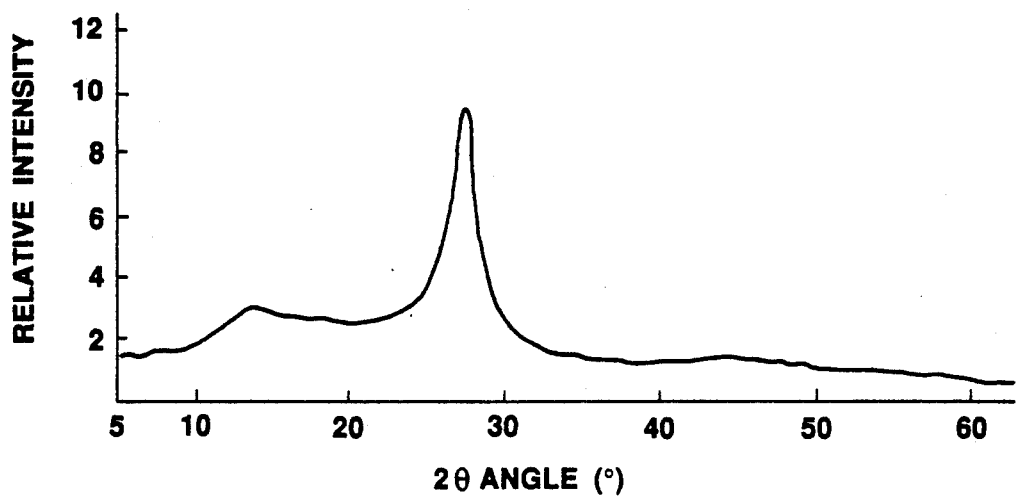
FIGS. 22 and 23 show X-ray diffraction patterns of a poly(amino-s-triazine) and a modified polymeric compound obtained by treatment with nitric acid solution, respectively.
Figure 23:
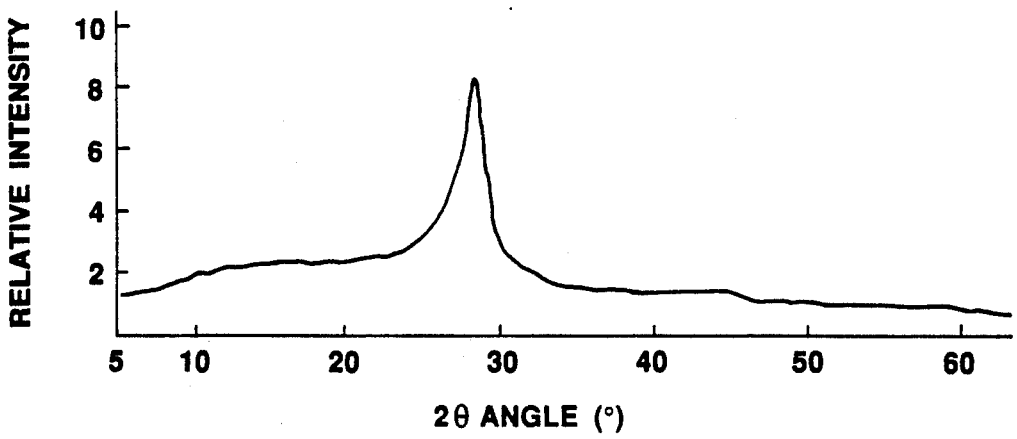

FIGS. 22 and 23 show X-ray diffraction patterns of the poly(amino-s-triazine) used as the starting material in Example 14 and the oxygen containing product of Example 14, respectively. The method and conditions of the X-ray diffraction analysis were as described in Example 1. The diffraction pattern of FIG. 23 too has a peak over 2θ angles of 26.5°–28.0°. This is an evidence that the fundamental structure of the starting polymer, viz. graphite-like layer structure, did not change by the treatment with nitric acid. However, the acid treatment caused broadening of the diffracted lines, which indicates lowering of molecular weight and crystallinity.

Figure 24:
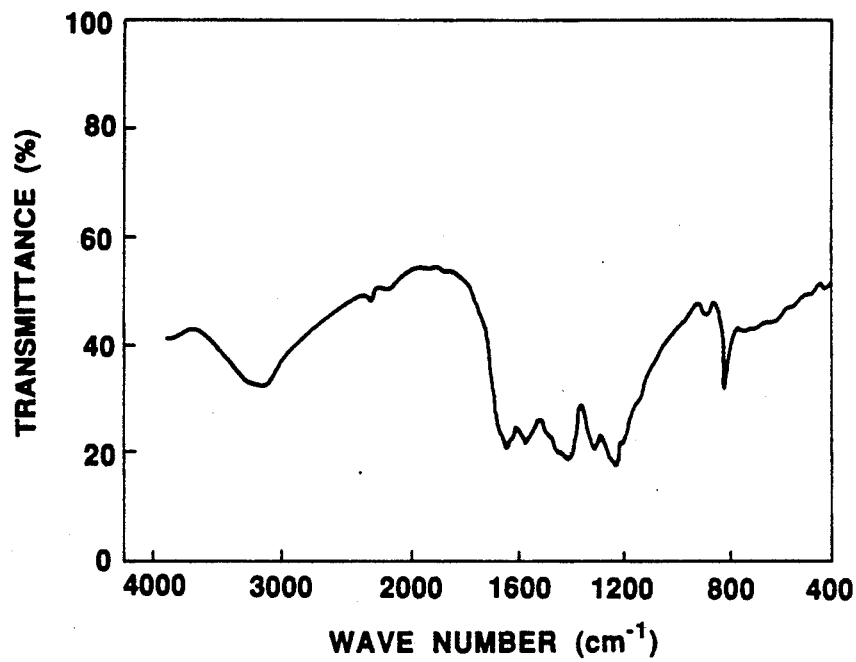
FIGS. 24 and 25 show IR absorption spectra of the poly(amino-s-triazine) and the modified polymeric compound, respectively.
Figure 25:
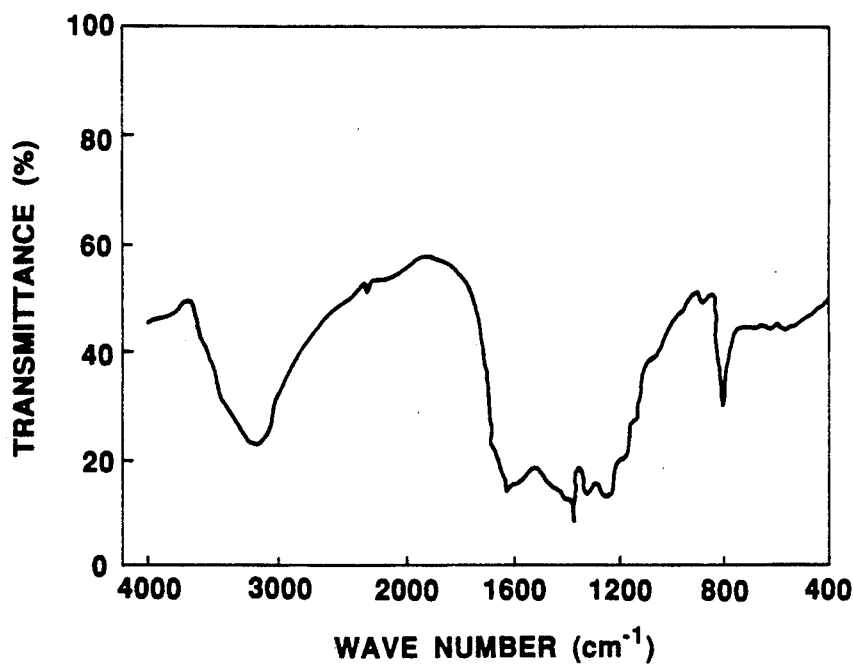

FIGS. 24 and 25 show IR absorption spectra of the starting polymer in Example 14 and the acid treated product of Example 14, respectively. The spectrum of FIG. 25 exhibits increased absorptions indicative of —OH group (3400 cm$^{-1}$) and —NO$_2$ group (1382 cm$^{-1}$). This is an evidence that the acid treated product has —OH group and, when nitric acid is used, —NO$_2$ group.

Figure 26:
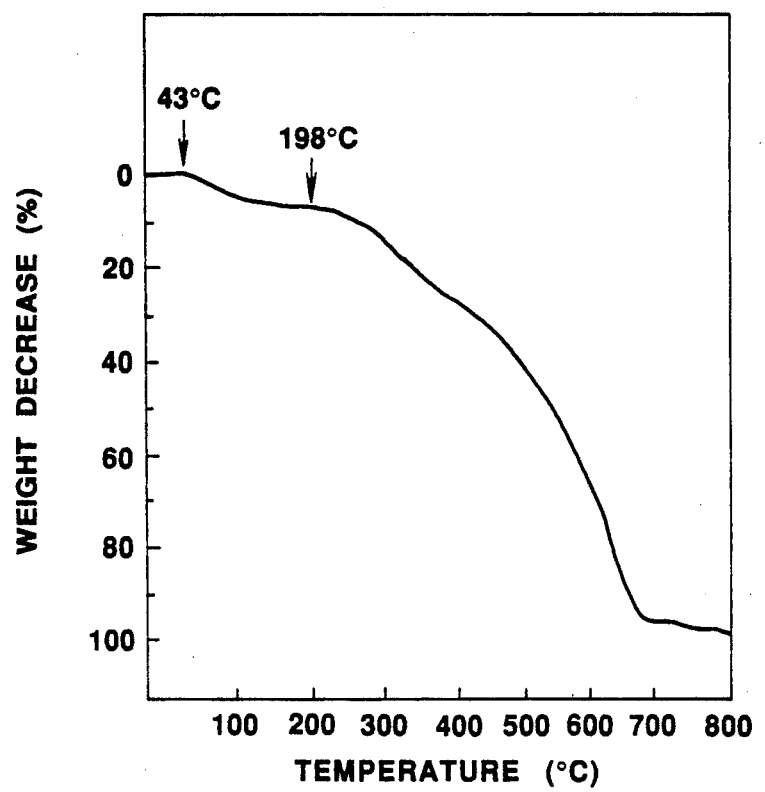
FIG. 26 is a graph showing the result of thermogravimetric analysis of the modified polymeric compound.

FIG. 26 shows the result of TG analysis of the product of Example 14 in the air. At about 40° C. a slight decrease in weight occurs probably by reason of detachment of adhering water or —OH groups. The decrease in weight beginning at about 200° C. is attributed to the decomposition or sublimation of the compound. From a comparison between FIG. 26 and FIG. 1 it is presumable that the acid treated product is considerably lower in molecular weight than the original poly(amino-s-triazine) and has —OH and —NO$_2$ groups as substituents at some of the terminals of the original polymer.

Figure 27:
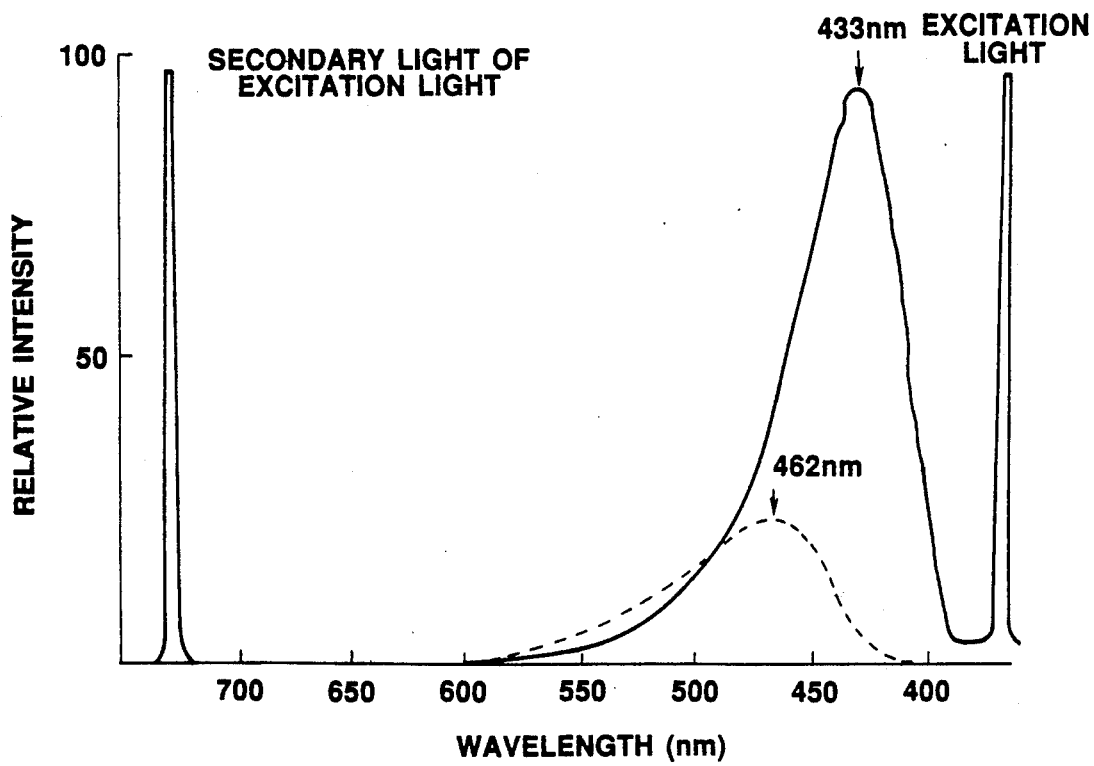
FIG. 27 shows fluorescence spectra of the poly(amino-s-triazine) and the modified polymeric compound.

FIG. 27 shows fluorescence spectra of the starting polymer in Example 14 (the curve in broken line) and the acid treated product of Example 14 (the curve in solid line). Excitation was made at 365 nm. The acid treated product emits blue light. Comparing with the original polymer, the acid treated product is far higher in the fluorecence intensity and has a peak shifted to the shorter wavelength side.

Figure 28:
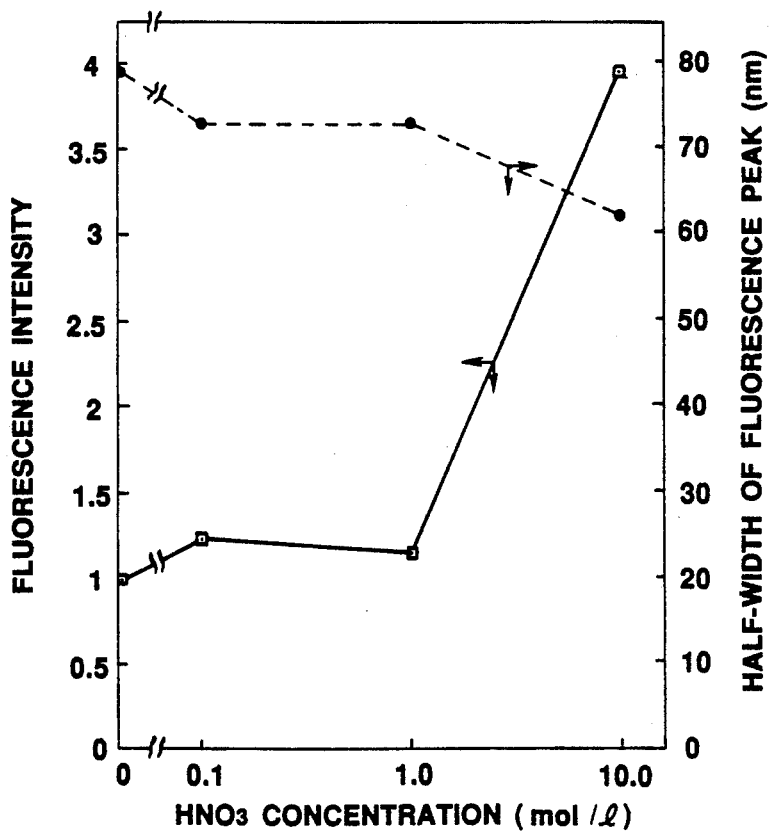
FIG. 28 is a graph showing the dependence of the fluorescence intensity and the half-width of the fluorescence peak of the modified polymeric compound on the concentration of the nitric acid solution.

For reference, the acid treatment of Example 14 was modified by decreasing the concentration of nitric acid solution to 1N and also to 0.1N. In these cases, the acid treated products did not appreciably differ from the original polymer in elementary analysis values, IR spectra and X-ray diffraction patterns. FIG. 28 shows the influence of the concentration of nitric acid solution used for the treatment on the fluorescence intensity and the half-width of the fluorescence peak of the acid treated product. It is seen that when the concentration of nitric acid is 1N or below the acid treatment does not significantly affect the fluorescent characteristics of the polymer. However, by treatment with 10N solution of nitric acid the fluorescence intensity becomes about 4 times the intensity of the original polymer, and the half-width of the peak narrows to about ⅔.

When the product of the treatment with 10N solution of nitric acid was subjected to heat treatment at 300° C., the fluorescence intensity became lower than the intensity of the polymer before treatment with nitric acid.

EXAMPLE 15

The acid treatment of Example 14 was modified by using 10 N solution of hydrochloric acid in place of nitric acid. The treating method was unchanged. The acid treated product became whitish. The result of elementary analysis and the deduced composition of the product are shown in Table 6. The X-ray diffraction pattern of the product was almost as shown in FIG. 23. The IR spectrum indicated the existence of —OH group in the acid treated product but did not indicate —NO$_2$.

EXAMPLE 16

The acid treatment of Example 14 was modified by using 50 wt% solution of hydrofluoric acid in place of nitric acid. The treating method was unchanged. The acid treated product became whitish. The result of elementary analysis and the deduced composition of the product are shown in Table 6. The X-ray diffraction pattern of the product was almost as shown in FIG. 23. The IR spectrum indicated the existence of —OH group in the acid treated product but did not indicate —NO$_2$.

TABLE 6

| | Elementary Analysis (wt %) | | | | |
|---|---|---|---|---|---|
| | C | N | H | O | Composition |
| starting polymer | 34.6 | 62.8 | 2.3 | — | $C_6N_{9.3}H_{4.8}$ |
| Ex. 14 | 27.4 | 52.7 | 3.1 | 16.8 | $C_6N_{9.8}H_{8.0}O_{2.8}$ $[C_6N_{8.4}H_{8.0}(NO_2)_{1.4}]$ |
| Ex. 15 | 30.3 | 55.2 | 3.0 | 11.5 | $C_6N_{9.4}H_{7.2}O_{1.7}$ $[C_6N_{9.4}H_{3.8}\cdot1.7H_2O]$ |
| Ex. 16 | 29.4 | 52.7 | 2.9 | 15.0 | $C_6N_{9.2}H_{7.2}O_{1.5}$ $[C_6N_{9.2}H_{4.2}\cdot1.5H_2O]$ |

For each example, the parenthesized formula is a different expression of the same composition.

What is claimed is:

1. A polymeric compound having a layer structure with a structural unit represented by the formula (1):

$$(C_3N_3)_2N_xH_y \qquad (1)$$

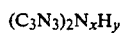

wherein ($C_3N_3$) represents s-triazine ring, $2 < x < 4$, and $0 < y < 8$, in which the s-triazine rings are linked to each other by connection of the three carbon atoms of each s-triazine ring to a carbon atom of another s-triazine ring by —NH— group except that in a portion of s-triazine rings in the compound one or two carbon atoms are bonding to a hydrogen atom or —NH$_2$ group.

2. A method of preparing a polymeric compound having a layer structure with a structural unit represented by the general formula (1), $$(C_3N_3)_2N_xH_y \qquad (1)$$

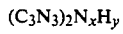

wherein ($C_3N_3$) represents s-triazine ring, $2 \leq x \leq 4$, and $0 < y \leq 8$, the method comprising the step of reacting cyanuric trichloride with an amino compound selected from the group consisting of ammonia and melamine.

3. A method according to claim 2, wherein the reaction is carried out at a temperature in the range from 400° to 600° C.

4. A method according to claim 2, wherein the reaction is carried out at a temperature in the range from room temperature to 400° C. to thereby obtain an oligomeric intermediate, the method further comprising the step of heating said intermediate in an inactive gas atmosphere at a temperature in the range from 400° to 600° C.

5. A method according to claim 2, wherein cyanuric trichloride is reacted with ammonia gas diluted with an inactive gas.

* * * * *